US006928642B2

(12) United States Patent  (10) Patent No.: US 6,928,642 B2
Seelemann  (45) Date of Patent: Aug. 9, 2005

(54) CODE GENERATION FOR MAPPING OBJECT FIELDS WITHIN NESTED ARRAYS

(75) Inventor: Ilene Ruth Seelemann, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 09/915,086

(22) Filed: Jul. 25, 2001

(65) Prior Publication Data

US 2004/0015928 A1 Jan. 22, 2004

(30) Foreign Application Priority Data

May 9, 2001 (CA) ............................................. 2347231

(51) Int. Cl.⁷ ................................................ G06F 9/45
(52) U.S. Cl. ...................... 717/160; 717/144; 717/150; 717/157
(58) Field of Search ............................... 717/106–109, 717/133, 136–161

(56) References Cited

PUBLICATIONS

Passerone et al., "Generation of Minimal Size Code for Schedule Graphs", IEEE, pp.: 668–673, Mar. 2001.*
Lobe et al., "The Object–Oriented Components of the Enterprise Parallel Programming Environment", Technology of Object–Oriented Languages and Systems Conference 11, http://www.cs.ualberta.ca/~duane/pdf/1993tools.pdf, pp. 1–15, 1993.*
King et al., "Structuring Depth–First Search Algorithms in Haskell", ACM, pp.: 344–354, 1995.*
Hendren et al., "Support Array Dependent Testing for an Optimizing/Parallelizing C Compiler", McGill University, Montreal, Canada, pp. i, 1–21, Oct. 1993.*

* cited by examiner

*Primary Examiner*—Ted T. Vo
(74) *Attorney, Agent, or Firm*—Gregory M. Doudnikoff

(57) ABSTRACT

A method and device for generating mapping source code to establish mapping connections between enterprise system nested array object fields and legacy system nested array object fields is disclosed. For each desired mapping connection in a received list of desired connections, a determination of an enterprise system field and legacy system field to be mapped, as well as a connection nesting level, is made. The identity of the system arrays containing the enterprise and legacy system fields is also determined. A logical tree is created which includes a root node, one leaf node for each desired connection, and, for each leaf node, N intermediate nodes interconnecting the leaf node with the root node, where N is equivalent to the determined nesting level of the connection associated with that leaf node, and where each of the N intermediate nodes that is successively further from the root node is associated with a successively more deeply nested target system array. The tree is then traversed depth-first to generate the desired mapping source code.

26 Claims, 12 Drawing Sheets

Enterprise System Field Information:

```
1    public class Site {
2           public static final int MAXBUILDINGS = 2;
3           public static final int MAXMEETINGROOMS = 12;
4           public static final int MAXDEPARTMENTS = 50;
5           public static final int MAXEMPLOYEES = 1000;
6           private Building buildings[] =
7              new Building[MAXBUILDINGS];
8    }
9
10   public class Building {
11          private MeetingRoom meetingRooms[] =
12             new MeetingRoom[Site.MAXMEETINGROOMS];
13          private Department departments[] =
14             new Department[Site.MAXDEPARTMENTS];
15   }
16
17   public class MeetingRoom {
18          private int size;
19          private int location;
20   }
21
22   public class Department {
23          private int deptNumber;
24          private String deptName;
25          private Employee employees[] =
26             new Employee[Site.MAXEMPLOYEES];
27   }
28
29   public class Employee {
30          private int empNumber;
31          private String empName;
32   }
```

FIGURE 3A

Legacy System Field Information:

```
1    :
2       private Bldg legacyBldgs[] =
3          new Bldg[Constants.MAXLEGACYBLDGS];
4    :
5
6       public class Constants{
7               public static final int MAXLEGACYBLDGS = 2;
8               public static final int MAXLEGACYROOMS = 4;
9               public static final int MAXLEGACYDEPTS = 50;
10              public static final int MAXLEGACYEMPLS = 1000;
11      }
12
13      public class Bldg {
14              private Room legacyRooms[] =
15                 new Room[Constants.MAXLEGACYROOMS];
16              private Dept legacyDepts[] =
17                 new Dept[Constants.MAXLEGACYDEPTS];
18      }
19
20      public class Room {
21              private String legacyLocn;
22              private int legacySize;
23      }
24
25      public class Dept {
26              private String legacyDeptName;
27              private int legacyDeptNum;
28              private Empl legacyEmpls[] =
29                 new Empl[Constants.MAXLEGACYEMPLS];
30      }
31
32      public class Empl {
33              private String legacyName;
34              private int legacyNumber;
35      }
```

FIGURE 3B

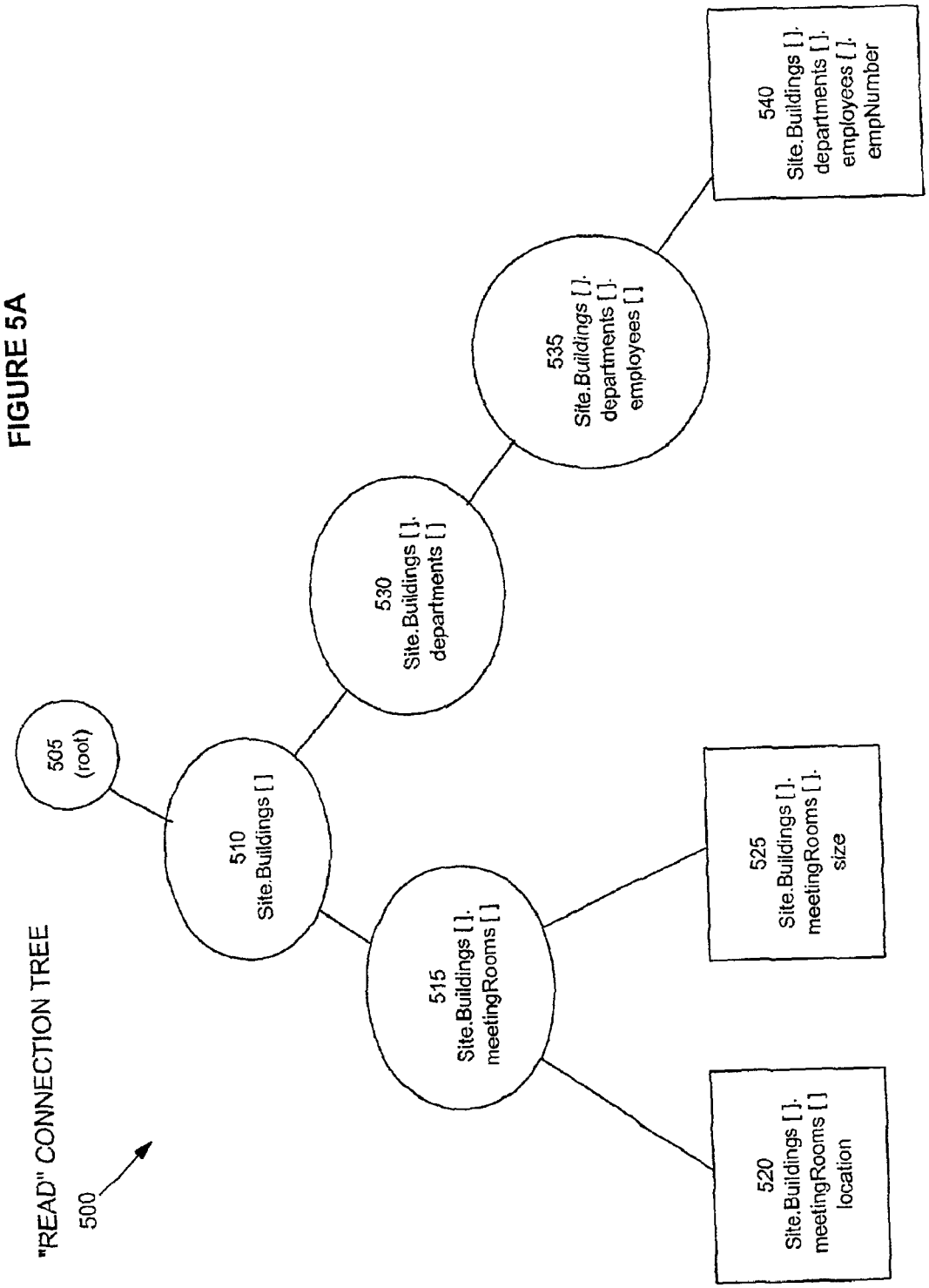

Generated "Read" Mapping Code:

```
1  for (i=0;i< MaxBldgs; i++)
2  {
3   for (j=0;j<MaxRooms;j++)
4   {
5    Site.buildings[i].meetingRooms[j].location =
6      APIgetLegacyData(legacyBldgs[i].legacyRooms[j].legacyLocn);
7
8    Site.buildings[i].meetingRooms[j].size =
9      APIgetLegacyData(legacyBldgs[i].legacyRooms[j].legacySize);
10  }
11  for (j=0; j< MaxDepts;j++)
12  {
13   for (k=0; k< MaxEmpls;k++)
14   {
15    Site.buildings[i].departments[j].employee[k].empNumber =
16      APIgetLegacyData(legacyBldgs[i].legacyDepts[j].
17      legacyEmpls[k].legacyNumber);
18   }
19  }
20 }
```

FIGURE 8A

Generated "Write" Mapping Code:

```
1  for (i=0;i< MaxLegacyBldgs; i++)
2  {
3   for (j=0;j<MaxLegacyRooms;j++)
4   {
5    APIsetLegacyData(legacyBldgs[i].legacyRooms[j].legacyLocn,
6      Site.buildings[i].meetingRooms[j].location);=
7   }
8   for (j=0; j< MaxLegacyDepts; j++)
9   {
10   for (k=0; k< MaxLegacyEmpls; K++)
11   {
12    APIsetLegacyData(
13      legacyBldgs[i].legacyDepts[j].legacyEmpls[k].legacyNumber,
14      Site.buildings[i].departments[j].employee[k].empNumber;
15   }
16  }
17 }
```

CODE GENERATION FOR MAPPING OBJECT FIELDS WITHIN NESTED ARRAYS

BACKGROUND OF THE INVENTION

1. Field of the Invention

The present invention relates to the field of code generation, and more particularly to software source code generation for mapping object fields within nested arrays.

2. Description of the Related Art

For several decades now, many business enterprises have employed computer technology within their enterprise systems to manipulate and store virtually all forms of business and technical data. This trend has of course been motivated by the recognition of the many benefits of computer technology and electronic data storage over traditional (e.g. paper-based) systems and data storage methods, including improved ease of access, efficiency of storage, flexibility, reliability and cost effectiveness. As a result, large databases of valuable business information (commonly referred to as "legacy" business or enterprise data) have been accumulated by way of these legacy systems.

An intrinsic problem associated with legacy enterprise systems however is the fact that they are difficult and costly to upgrade to accommodate new computer technology or platforms. As a result, developers of new enterprise systems may find it desirable to be able to access legacy data assets from within new enterprise systems without the need for a wholesale upgrade of legacy systems. A common method for achieving such access has been the use of mapping software. Mapping software essentially acts as an interface or conduit for data between legacy systems and new enterprise systems at run-time. More specifically, mapping software defines "connections" between legacy data entities (e.g. data structures within a legacy application) and enterprise system objects (e.g. data structures in a new enterprise application) which permit legacy data to be accessed by enterprise systems during their operation. The connections may be unidirectional in nature, in which case only a reading of legacy data into enterprise system objects is permitted, or bi-directional, wherein both a reading of legacy data into enterprise system objects and a subsequent writing of any updated data back into legacy system data entities is possible.

Manual development of mapping software is typically tedious. A developer is required to first identify legacy data entities to be mapped to enterprise system objects and thereafter to write software by hand to implement the desired mapping connection(s). In some cases the developer may be required to examine the low-level representation of various data types to ensure that the mapped entities are compatible, so that mapping errors are avoided. If the new enterprise system is implemented in a different programming language from the legacy system, the developer may be required to implement interface code between the new enterprise system and the legacy system to facilitate communication between them. In the event that the standard software development cycle of design, manual coding, test and debugging is followed, development may be slow to progress. Alternatively, when development is performed on a more ad hoc basis, mapping software may be produced more quickly, but it may contain programming errors.

In view of these difficulties, various software tools have emerged to assist in the development of mapping software. For example, tools such as Mapper Editor in the Enterprise Access Builder™ of VisualAge® for Java™ provide a graphical user interface and user controls which permit desired mapping connections to be identified in a straightforward manner and mapping software to be generated automatically after the desired connections have been specified. Such tools improve the efficiency of the mapping software development process by reducing the tedium and potential for error in creating functional mapping code as compared with manual techniques.

Known tools such as the above-described Mapper Editor allow simple and compound fields within new enterprise system objects to be mapped to corresponding fields in legacy systems, even when the enterprise system fields are contained within a "parent" array (e.g. when a new object field to be mapped is instantiated N times, with each instantiation comprising a unique element of an N-element array). Disadvantageously, however, known tools are ill-suited for facilitating the generation of mapping source code in the case when enterprise system fields to be mapped are contained within nested arrays.

Hence what is needed is a method and device to facilitate the generation of source code for mapping enterprise system fields within nested arrays to legacy data entities.

SUMMARY OF THE INVENTION

The present invention is directed to a method and device which addresses at least some of the shortcomings described above.

In particular, the invention facilitates the generation of software source code for mapping object fields within nested arrays to legacy data. The invention may thus improve the efficiency of the mapping software development process by reducing the amount of time and effort that is required to create functional mapping code as compared with manual techniques.

For each desired mapping connection in a received list of desired connections, a determination of an enterprise system field and legacy system field to be mapped, as well as a connection nesting level, is made. The identity of the system arrays containing the enterprise and legacy system fields is also determined. A logical tree is created which includes a root node, one leaf node for each desired connection, and, for each leaf node, N intermediate nodes interconnecting the leaf node with the root node, where N is equivalent to the determined nesting level of the connection associated with that leaf node, and where each of the N intermediate nodes that is successively further from the root node is associated with a successively more deeply nested system array. The tree is then traversed depth-first to generate the desired mapping source code.

In accordance with an aspect of the present invention there is provided a method of generating program source code to perform a mapping task in which enterprise system nested array object fields and legacy system nested array object fields are mapped to one another, the method comprising: performing a depth-first traversal of a logical tree having a root node, a leaf node for each desired mapping connection, and intermediate nodes between the root node and the leaf nodes, each intermediate node being associated with an array, the depth-first traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

In accordance with another aspect of the present invention there is provided a method of generating program source code to perform a mapping task in which enterprise system nested array object fields and legacy system nested array object fields are mapped to one another, the method comprising: receiving a list of desired mapping connections between enterprise system fields and legacy system fields; for each desired connection between an enterprise system field and a legacy system field, determining connection information comprising: the identity of the nested enterprise arrays containing the enterprise system field; the identity of the nested legacy arrays containing the legacy system field; and a nesting level of the connection; creating a logical tree representative of the mapping task comprising: a root node; one leaf node for each desired mapping connection; and for each leaf node, N intermediate nodes interconnecting the leaf node and the root node, where N is equivalent to the determined nesting level of the connection associated with the leaf node, and where each of the N intermediate nodes that is successively further from the root node is associated with an array that is successively more deeply nested; and performing a depth-first traversal of the logical tree to generate mapping source code, the traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

In accordance with still another aspect of the present invention there is provided a method of establishing mapping connections between enterprise system nested array object fields and legacy system nested array object fields comprising: generating mapping source code according to any the above methods; creating executable code from the generated source code; and running the executable code.

In accordance with another aspect of the present invention there is provided a computer readable medium storing computer software that, when loaded into a computing device, adapts the device to: perform a depth-first traversal of a logical tree having a root node, a leaf node for each desired mapping connection, and intermediate nodes between the root node and the leaf nodes, each intermediate node being associated with an array, the depth-first traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

In accordance with still another aspect of the present invention there is provided A computer readable medium storing computer software that, when loaded into a computing device, adapts the device to: receive a list of desired mapping connections between enterprise system fields and legacy system fields; determine, for each desired connection between an enterprise system field and a legacy system field, connection information comprising: the identity of the nested enterprise arrays containing the enterprise system field; the identity of the nested legacy arrays containing the legacy system field; and a nesting level of the connection; create a logical tree representative of the mapping task comprising: a root node; one leaf node for each desired mapping connection; and for each leaf node, N intermediate nodes interconnecting the leaf node and the root node, where N is equivalent to the determined nesting level of the connection associated with the leaf node, and where each of the N intermediate nodes that is successively further from the root node is associated with an array that is successively more deeply nested; and perform a depth-first traversal of the logical tree to generate mapping source code, the traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

In accordance with another aspect of the present invention there is provided a computing device comprising a processor and persistent storage memory in communication with the processor, storing processor readable instructions adapting the device to: perform a depth-first traversal of a logical tree having a root node, a leaf node for each desired mapping connection, and intermediate nodes between the root node and the leaf nodes, each intermediate node being associated with an array, the depth-first traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

In accordance with still another aspect of the present invention there is provided a computing device comprising a processor and persistent storage memory in communication with the processor, storing processor readable instructions adapting the device to: receive a list of desired mapping connections between enterprise system fields and legacy system fields; determine, for each desired connection between an enterprise system field and a legacy system field, connection information comprising: the identity of the nested enterprise arrays containing the enterprise system field; the identity of the nested legacy arrays containing the legacy system field; and a nesting level of the connection; create a logical tree representative of the mapping task comprising: a root node; one leaf node for each desired mapping connection; and for each leaf node, N intermediate nodes interconnecting the leaf node and the root node, where N is equivalent to the determined nesting level of the connection associated with the leaf node, and where each of the N intermediate nodes that is successively further from the root node is associated with an array that is successively more deeply nested; and perform a depth-first traversal of the logical tree to generate mapping source code, the traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

In accordance with another aspect of the present invention there is provided a device for generating program source code to perform a mapping task in which enterprise system nested array object fields and legacy system nested array object fields are mapped to one another, the device comprising: means for performing a depth-first traversal of a logical tree having a root node, a leaf node for each desired mapping connection, and intermediate nodes between the root node and the leaf nodes, each intermediate node being associated with an array, the depth-first traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

In accordance with still another aspect of the present invention there is provided a device for generating program source code to perform a mapping task in which enterprise system nested array object fields and legacy system nested array object fields are mapped to one another, the device comprising: means for receiving a list of desired mapping connections between enterprise system fields and legacy system fields; means for determining, for each desired connection between an enterprise system field and a legacy system field, connection information comprising: the identity of the nested enterprise arrays containing the enterprise system field; the identity of the nested legacy arrays containing the legacy system field; and a nesting level of the connection; means for creating a logical tree representative of the mapping task comprising: a root node; one leaf node for each desired mapping connection; and for each leaf node, N intermediate nodes interconnecting the leaf node and the root node, where N is equivalent to the determined nesting level of the connection associated with the leaf node, and where each of the N intermediate nodes that is successively further from the root node is associated with an array that is successively more deeply nested; and means for performing a depth-first traversal of the logical tree to generate mapping source code, the traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

In accordance with another aspect of the present invention there is provided a method of generating program source code to perform a mapping task in which nested array object fields of a first system and nested array object fields of a second system are mapped to one another, the method comprising: performing a depth-first traversal of a logical tree having a root node, a leaf node for each desired mapping connection, and intermediate nodes between the root node and the leaf nodes, each intermediate node being associated with an array, the depth-first traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

In accordance with still another aspect of the present invention there is provided a method of generating program source code to perform a mapping task in which nested array object fields of a first system and nested array object fields of a second system are mapped to one another, the method comprising: receiving a list of desired mapping connections between nested array object fields of a first system and nested array object fields of a second system; determining, for each desired connection between a field of the first system and a field of the second system, connection information comprising: the identity of the nested arrays containing the first system field; the identity of the nested arrays containing the second system field; and a nesting level of the connection; creating a logical tree representative of the mapping task comprising: a root node; one leaf node for each desired mapping connection; and for each leaf node, N intermediate nodes interconnecting the leaf node and the root node, where N is equivalent to the determined nesting level of the connection associated with the leaf node, and where each of the N intermediate nodes that is successively further from the root node is associated with an array that is successively more deeply nested; and performing a depth-first traversal of the logical tree to generate mapping source code, the traversal comprising: for each intermediate node visited when traversing away from the root node, generating program source code to open a loop; for each visited leaf node, generating program source code to create the mapping connection represented by the visited leaf node; and for each intermediate node having no unvisited children that is visited when traversing towards the root node, generating program source code to close the loop.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention:

FIG. 3A illustrates exemplary enterprise system source code containing declarations of nested array object fields capable of being mapped to legacy data by the system of FIG. 1;

FIG. 3B illustrates exemplary legacy system source code containing declarations of nested array object fields capable of being mapped to enterprise system fields by the system of FIG. 1;

FIGS. 5A and 5B illustrate logical tree representations of the desired connections of FIG. 4;

FIGS. 8A and 8B illustrate exemplary mapping source code generated by the system of FIG. 1.

DESCRIPTION OF THE PREFERRED EMBODIMENT

Figure 1:
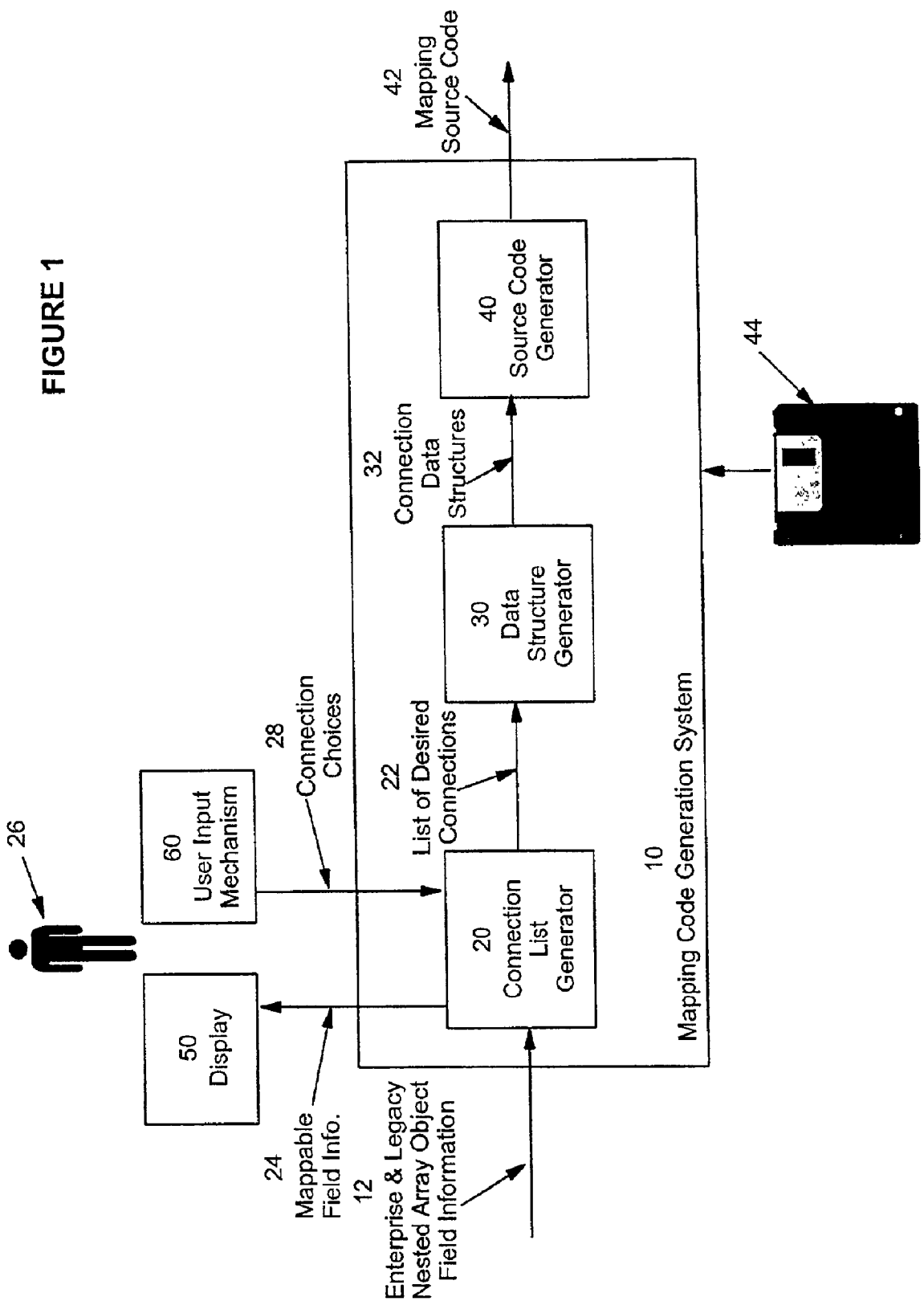
FIG. 1 is a schematic diagram of a mapping code generation system exemplary of an embodiment of the present invention.

With reference to FIG. 1, a mapping code generation system 10 includes a connection list generator 20, a data structure generator 30, and a source code generator 40. The system 10 has a single primary input 12 for enterprise system nested array object field information (i.e., information about object fields contained within nested arrays in a new enterprise system) and legacy system nested array object field information (i.e., information about object fields contained within nested arrays in a legacy system). For clarity, the term "nested array" indicates an array containing at least one other array. The system 10 further has a single primary output 42 for generated mapping source code. Input 12 inputs to the connection list generator 20, and output 42 outputs from the source code generator 40. The system 10 further has an intermediate output 24 from the connection list generator 20 as well as an intermediate input 28 to the generator 20. Intermediate output 24 carries information to display 50 regarding nested array object fields of the new enterprise system (also referred to as "enterprise system fields") and nested array object fields of the legacy system ("legacy system fields") for presentation to a developer 26. Intermediate input 28 carries user input representing mapping connection choices (i.e. developer selections as to which of the presented enterprise system fields and legacy system fields are to be mapped to one another) from user input mechanism 60. A link 22 suitable for carrying a desired connection list interconnects the connection list generator 20 with the data structure generator 30, while a separate link 32 suitable for carrying "desired connection" data structures (i.e. data structures representative of the developer's connection choices) interconnects the data structure generator 30 with the source code generator 40.

The system 10 is typically a conventional computing device or server executing software 44 that has been tailored to implement a mapping code generation system as described herein. The software 44 may be loaded into memory of the system 10 from any suitable computer readable medium, such as a magnetic disk, optical storage disk, memory chip, or file downloaded from a remote source. In an alternative embodiment, the system 10 may be implemented as a distributed system comprising multiple computing devices or servers interconnected by a network, wherein the modules 20, 30 and 40 are executed on different devices/servers, and wherein inter-module data communication is achieved by way of a network communications protocol for example. In another alternative, the modules may be grouped within particular devices or servers in a distributed system. For example, modules 20 and 30 may be executed on one device/server while module 40 may be executed on a different device/server. Those skilled in the art will recognize that numerous alternative system architectures are possible.

Connection list generator 20 is a module capable of generating a list of one or more desired mapping connections between enterprise system nested array object fields and legacy system nested array object fields based on the mapping connection choices of a software developer 26. The generator 20 has a primary input 12 for receiving information about enterprise system fields and legacy system fields which are potentially mappable (i.e. able to be mapped) to one another. The generator 20 is capable of processing the received information to identify a set of enterprise system fields (an "enterprise field set") and a set of legacy system fields (a "legacy field set"), in which at least some of the members of the enterprise field set are mappable to at least some of the members of the legacy field set. The two sets are output over intermediate output 24 for display to a developer 26 on a display 50. The generator 20 is further capable of receiving input from a user input mechanism 60 (by way of intermediate input 28) that is representative of mapping connection choices made by the developer 26 between displayed mappable fields. Finally, the generator 20 is capable of interpreting the input received over intermediate input 28 to generate a list of mapping connections desired by the developer 26, and of outputting this list over link 22.

Enterprise system field information received by the connection list generator 20 over input 12 in the present embodiment is in the form of one or more electronic source code files of a new enterprise system. In particular, the received source code includes at least one declaration for a nested array of objects containing one or more fields that are capable of being mapped to legacy system fields. Similarly, the legacy data information received over input 12 in the present embodiment is also in the form of one or more electronic source code files of a legacy system. The legacy source code includes at least one declaration for a nested array of objects containing one or more fields that are capable of being mapped to enterprise system object fields.

The programming languages in which the enterprise system source code and the legacy source code are expressed is typically, but not necessarily, a higher-level programming language such as Java™ or C. The programming language in which the enterprise system source code is expressed may or may not be the same as the programming language in which the legacy source code is expressed. In cases where the enterprise system source code and the legacy source code are in fact expressed in the same programming language, the legacy source code may have been converted to the same language as the enterprise system source code by a legacy code "importer" feature of the system 10 (not illustrated). In the present embodiment, the enterprise system source code and legacy system source code are expressed in Java™.

The desired connection list output by the connection list generator 20 over link 22 in the present embodiment is in the form of an enumeration interface which forms part of the Java™ Developer's Kit (JDK). As will be understood by those skilled in the art, the enumeration interface provides access to a data structure storing a series of enumerations or elements which are accessible by way of various predefined methods such as "nextElement" for example. In the present case, each enumeration comprises a connection desired by the developer 26 and includes connection-specific information, such as the identity of an enterprise system field to be mapped, the identity of the nested enterprise system arrays containing the enterprise system field to be mapped, the identity of the corresponding legacy system field with which the enterprise system field is to be connected, and the identity of the nested legacy system arrays containing the corresponding legacy system field. Also included in each enumeration is a directionality indicator indicating whether the desired connection is to be unidirectional or bi-directional, i.e. whether the connection is to be a "read" connection (i.e. a mapping connection in which the value of a "source" legacy system field is read into a "target" enterprise system field at run time), a "write" connection (i.e. a mapping connection in which the value of a "source" enterprise system field is written to a "target" legacy system field at run time), or both. Of course, the connection list may be represented without the use of the enumeration interface by various data structures, such as a linked list or an array for example, in alternative embodiments. The employed data structure may have associated with it various procedures, functions or methods designed to facilitate access to the desired connections represented therein, such as a "getNext Entry" function for example.

Display 50 is a conventional display device, such as a Cathode Ray Tube (CRT), liquid crystal or flat-screen display, capable of presenting information about mappable enterprise system fields and legacy system fields to a software developer 26. The display 50 may form part of the computing device comprising the mapping code generation system 10.

The user input mechanism 60 is a device operable by a developer 26 to select desired mapping connections from among potentially connectable enterprise system fields and legacy system fields displayed on the display 50. In particular, the user input mechanism 60 may be a keyboard, mouse or touch screen usable in conjunction with the display 50 to interact with the displayed enterprise system fields and legacy system fields for the purpose of specifying one or more desired mapping connections. The user input mechanism 60 may form part of the computing device comprising the mapping code generation system 10.

The data structure generator 30 is module capable of converting a received list of desired mapping connections between enterprise system fields and legacy system fields into a pair of "desired connection" data structures representative of the developer's connection choices. The generated structures are designed to be readily traversable to generate corresponding mapping source code. Data structure generation by the generator 30 comprises two phases. In the first phase, the desired connections in the received list are sorted in order of connection nesting depth of the desired connection. The term "connection nesting depth" refers to the nesting level (i.e. the number of arrays containing a particular field, e.g., the field "outermostArray[1].deeperArray[1].InnermostArray[1].field" has a nesting level or depth of three) of both the enterprise system field and legacy system field to be mapped. The present embodiment only allows mapping between enterprise system fields and legacy system fields having the same nesting level, thus the nesting level of the enterprise system field and legacy system field will be equivalent. In the second phase, the sorted list is traversed to create the "desired connection" data structures. In the present embodiment, two "desired connection" data structures are created. The first data structure represents all of the "read" connections desired by the developer, while the second data structure represents all of the desired "write" connections. Each of the generated structures comprises a multi-dimensional array that is organized by the identities of the nested enterprise arrays containing the enterprise system field to be mapped, as well as the nesting level of the field to be mapped (as will be described). The data structure generator 30 receives the list of desired connections by way of link 22 and outputs the generated data structures to the source code generator 40 over link 32.

The source code generator 40 is a module capable of processing two received data structures representative of a set of desired "read" mapping connections and "write" mapping connections and of generating corresponding mapping software source code to implement the desired mapping connections at run time. Each of the two received data structures is traversed in sequence, with each traversal facilitating the generation of source code which implements the desired connections represented in that structure. Thus, traversal of the "read" connection data structure facilitates generation of source code implementing all of the "read" connections desired by the developer, and traversal of the "write" connection data structure facilitates the generation of source code implementing all of the desired "write" connections. The source code generator 40 receives the two data structures over link 32 and outputs the generated mapping source code over output 42. Each of the generated "read" source code and the generated "write" source code is in the form of a method in the same Java™ class in the present embodiment.

Links 22 and 32 comprise inter-module data communication channels within the system 10 which, depending upon the chosen implementation of modules 20, 30 and 40, may be implemented in a variety of ways. For example, if the modules 20, 30 and 40 are chosen to comprise serially-invoked subordinate procedures or methods within a controlling "main" computer program, the passing of data over links 22 and 32 may be achieved through conventional parameter-passing between the subordinate modules 20, 30 and 40 and the main program. Alternatively, if the modules 20, 30 and 40 are implemented as distinct processes, links 22 and 32 may be achieved through conventional inter-process communication techniques. Those skilled in the art will recognize that many alternative software-based or even hardware-based implementations exist.

The mapping code generation system 10 further includes a user interface (not illustrated) capable of being employed by a developer 26 to control the execution of various steps in the mapping code generation process. The user interface may include various controls, such as menus, buttons or command-entry windows, for this purpose. The user interface is typically usable in conjunction with the display 50 and the user input mechanism 60 to provide an integrated display and control console usable by the developer 26 for convenient overall mapping software code generation.

Figure 2:
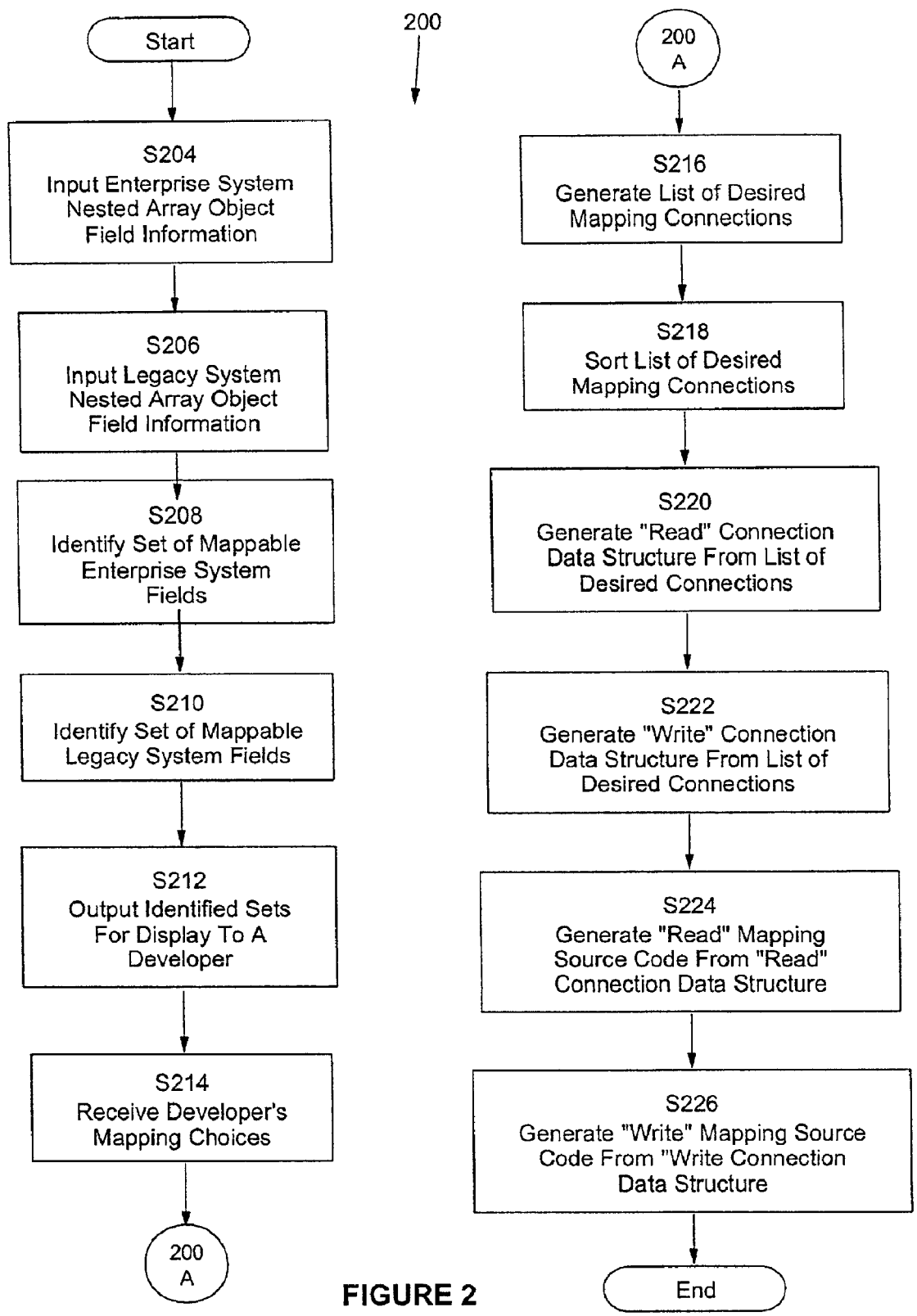
FIG. 2 illustrates a flowchart of steps performed by the system of FIG. 1 during its operation.

The operation of the present embodiment is illustrated in the flowchart of steps 200 of FIG. 2, with additional reference to FIG. 1 and FIGS. 3A, 3B, 4, 5A, 5B, 6A, 6B, 7, 8A and 8B. In particular, the operation of present embodiment occurs in three stages generally corresponding to the three modules 20, 30 and 40 of FIG. 1. In the first stage, a list of desired connections between one or more enterprise system fields and legacy system fields is generated on the basis of selections made by a developer 26. Stage 1 is triggered by a software developer 26 through interaction with the user interface of system 10 and spans steps S204 to S216 (inclusive). In the second stage, a pair of data structures designed to be readily traversable to generate mapping code is generated from the desired connection list. Stage 2 occurs automatically after the execution of Stage 1, and spans steps S218 to S222 (inclusive). In the third and final stage, the generated data structures are processed to generate mapping software source code to implement the desired mapping connections chosen by the developer. Stage 3 is executed automatically after the execution of Stage 2 and spans steps S224 to S226 (inclusive).

It will be appreciated that a principal difficulty in generating mapping source code to connect nested array object fields of a new enterprise system to nested array object fields of a legacy system is the generation of loops (e.g. "for" loops) around mapping assignment statements that are nested so as to eliminate any redundant outer loops. This difficulty is addressed in the present embodiment through the method by which the desired connection list is processed into corresponding "desired connection" data structures (Stage 2) and the method by which the generated structures are subsequently traversed to create mapping software source code (Stage 3).

Starting with Stage 1, nested array object field information is initially input into the mapping code generation system 10 and received by the connection list generator 20 in step S204 (FIG. 2). In the present embodiment, the inputting of enterprise system field information is achieved by the reading of an electronic source code file comprising enterprise system source code from a computer readable medium, such as a hard drive, floppy disk, or optical storage device for example. Legacy system field information is input in step S206 in an analogous manner. Steps S204 and S206 are initiated by the developer 26 through interaction with a user interface of the mapping code generation system 10 (not shown), using conventional techniques. It is understood that steps S204 and S206 may be executed in reverse order.

The enterprise system source code input by the connection list generator 20 in the present instance is shown in FIG. 3A. The code, which is written in the Java™ programming language, defines four arrays, namely "buildings[ ]", "meetingRooms[ ]", "departments [ ]", and "employees [ ], at lines 6–7, 11–12, 13–14 and 25–26, respectively. The arrays (referenced herein using trailing brackets "[ ]") are of length MAXBUILDINGS, MAXMEETINGROOMS, MAXDEPARTMENTS, and MAXEMPLOYEES, respectively, where upper case variables comprise positive integer constants declared in the Site class at lines 2 to 5. In particular, the "employees[ ]" array is nested within the "departments[ ]" array, and the "departments[ ]" and "meetingRooms[ ]" arrays are nested within the "buildings[ ]" array. The enterprise system thus has three levels of array nesting (i.e. the maximum nesting depth is three). Notably, it may be seen at lines 1 to 8 that the "buildings[ ]" array is contained within the class "Site". It will be appreciated that such containment does not increase the level of nesting of the "buildings[ ]" array, because the containing class "Site" is not an array. For clarity, the arrays "buildings[ ]", "meetingRooms[ ]", "departments[ ]", and "employees[ ]" are referred to as "enterprise system arrays".

The legacy system source code input by the connection list generator 20, shown in FIG. 3B, is largely analogous to the enterprise system source code described above. In particular, the legacy code defines four arrays "legacyBldgs[ ]", "legacyRooms[ ]", "legacyDepts[ ]", and "legacyEmpls[ ]", at lines 2–3, 14–15, 16–17 and 28–29, respectively. These four arrays (referred to as "legacy system arrays") have the same dimensions and the same nesting structure as the four aforedescribed enterprise system arrays, with the exception that the array "legacyBldgs[ ]" is not contained within a "Site" class. For clarity, the field and array names of FIG. 3B are prefixed by the word "legacy" to clearly identify these variables as forming part of the legacy system.

In step S208, the enterprise system source code of FIG. 3A is processed by the connection list generator 20 to identify mappable nested array object fields contained therein. Processing involves the parsing of source code to search for certain syntactic patterns indicating that a nested array object field has been declared. In the present case, this parsing results in the identification of six mappable enterprise system fields. The first two identified fields "location" and "size" are contained within each element of the nested array "Site.buildings[ ].meetingRooms[ ]" and are declared at lines 18 and 19 of FIG. 3A. The next two identified fields "deptNumber" and "deptName" are contained within each element of the nested array "Site.buildings[ ].departments[ ]" and are declared at lines 23 and 24. Finally, the last two identified fields "empNumber" and "empName" are contained within each element of the nested array "Site.buildings[ ].departments[ ].employees[ ]" and are declared at lines 30 and 31. The first four identified enterprise system fields have a nesting level of two, and the last two fields have a nesting level of three. Cumulatively, the six identified mappable enterprise system fields are referred to as the "enterprise field set".

In step S210, the legacy system source code of FIG. 3B is processed by the connection list generator 20 to identify any mappable nested array object fields contained therein. The methodology employed to identify mappable legacy system fields in this step is analogous to the methodology employed to identify mappable enterprise system fields in step S208. In the present case, six mappable legacy system fields are identified. The first two identified fields "legacyLocn" and "legacySize" are contained within each element of the array "legacyBldgs[ ].legacyRooms[ ]" and are declared at lines 21 and 22 of FIG. 3B. The next two identified fields "legacyDeptNum" and "legacyDeptName" are contained within each element of the array "legacyBldgs[ ]. legacyDepts[ ]" and are declared at lines 26 and 27. The last two identified fields "legacyNumber" and "legacyName" are contained within each element of the array "legacyBldgs[ ].legacyDepts[ ]. legacyEmpls[ ]" and are declared at lines 33 and 34. The first four identified legacy system fields have a nesting level of two, and the last two fields have a nesting level of three. Cumulatively, the six identified legacy system fields are referred to as the "legacy field set".

In step S212, the sets of mappable enterprise system and legacy system fields identified in steps S208 and S210 are output over intermediate output 24 for presentation to a developer 26 on a display 50. The generated sets are displayed on the display 50 in a manner suitable for allowing a developer 26 to identify mappable enterprise and legacy system fields and establish connections between them. Various user controls, such as menus or buttons (not illustrated) may be displayed to support this objective. Nested array and field information may be displayed textually, which of course may be accomplished in a wide variety of ways. The chosen method will likely depend, at least in part, upon the nature of the computing device employed to implement the system 10.

The software developer 26 subsequently employs user input mechanism 60, as well as any necessary user controls of the user interface, to interact with the displayed enterprise field set and legacy field set and to specify one or more mapping connection choices between displayed mappable fields. It will be understood that the data types of an enterprise system field and legacy system field which have been chosen to be mapped to one another will usually be the same (e.g. both will be of type "integer"), although this is not a requirement. As well, the nesting depth of the nested array object field and the legacy data field should be the same in order for the system 10 to be able to generate mapping code as described herein. It is not, however, required for the number of instances of the enterprise system field to match the number of instances of the legacy system field. The system 10 is capable of generating mapping code in various scenarios of enterprise system array size versus corresponding legacy system array size (detected at run time), as will later be described.

Figure 4:
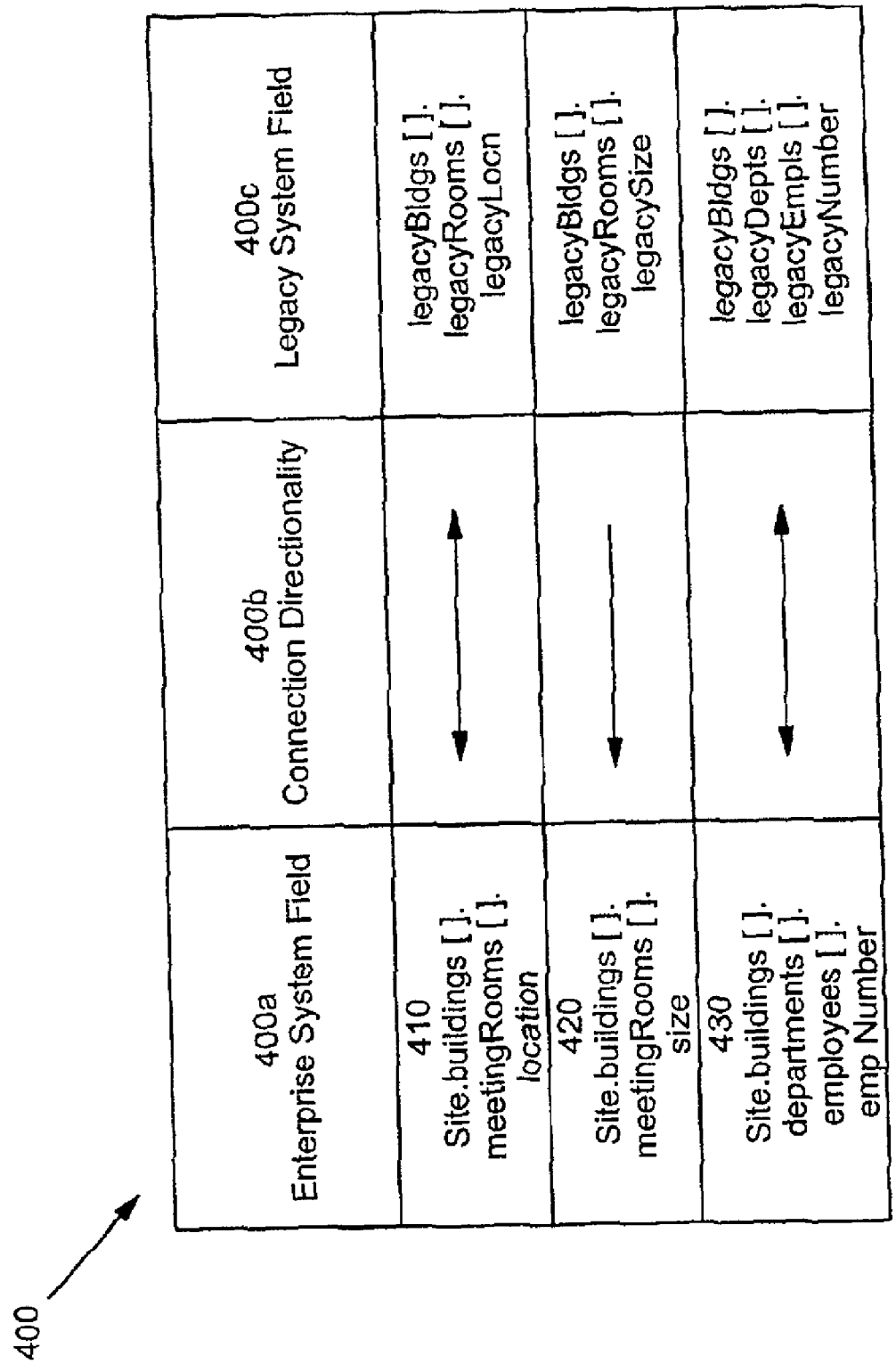
FIG. 4 illustrates a developer's desired mapping connections as displayed on a display of the system of FIG. 1.

As the developer 26 makes new connection choices or modifies existing ones, the display is updated to reflect the current choices. An exemplary display of a developer's current mapping connection choices (as may be displayed on the display 50) is illustrated in FIG. 4. The user interface and controls which may be utilized by the developer 26 to make or modify mapping choices are omitted from FIG. 4 for clarity. The developer's desired connection choices comprise a table 400 in which each row represents a single desired connection. The table 400 has three columns 400a, 400b and 400c. The first column 400a identifies the enterprise system field to be mapped. The second column 400b displays a directionality indicator that indicates (graphically in this case) whether a "read" connection, a "write"

connection, or both are desired. In the present embodiment, a left-pointing arrow in column 400b indicates that a unidirectional "read" connection is desired, a right-pointing arrow indicates that a unidirectional "write" connection is desired, and a double-headed arrow indicates that a bi-directional "read" and "write" connection is desired. Other types of indicators (e.g. textual) may be used in alternative embodiments. The third column 400c identifies the legacy system field with which a connection is desired.

In the present embodiment, a row is added to the table each time that the developer 26 make a new connection choice. Thus in the exemplary table 400 of FIG. 4, the existence of three rows 410, 420 and 430 indicates that three mapping connections are desired by the developer 26. In particular, the first row 410 indicates that a bi-directional "read" and "write" mapping connection is desired between enterprise system field "Site.buildings[ ].meetingRooms[ ] Location" and legacy system field "legacyBldgs[ ].legacyRooms.legacyLocn". The second row 420 indicates that a unidirectional "read" mapping connection is desired between enterprise system field "Site.buildings[ ].meetingRooms[ ].size" and legacy system field "legacyBldgs[ ].legacyRooms. legacySize". Finally, the third row 430 indicates that a bi-directional mapping connection is desired between enterprise system field "Site.buildings[ ].departments[ ].employees[ ].empNumber" and legacy system field "legacyBldgs[ ].legacyDepts[ ].legacyEmpls[ ].legacyNumber".

Once the developer 26 is satisfied with his/her desired mapping connection choices, the developer further interacts with the user controls to trigger code generation (e.g. by pressing a "Generate Code" button). Consequently, in step S214 the developer's finalized connection choices (which in the present case are assumed to be the choices indicated in table 400) are received by the connection list generator 20 by way of intermediate input 28. The connection list generator 20 subsequently interprets the received input to generate a corresponding list of desired mapping connections in step S216. In the present case, a linked list having three nodes (one node for each desired connection) is created. Each node is populated with the connection information relevant to that node, including: the identities of the enterprise system field and the legacy system field to be connected; the identities of the enterprise system nested arrays and legacy system nested arrays containing the fields to be connected; and the desired directionality of the connection. Stage 1 concludes with the generated connection list being output to the data structure generator 30 over link 22.

In Stage 2, the list of desired connections received by the data structure generator 30 is initially sorted by order of desired connection nesting depth in step S218. Sorting, which comprises the first of two phases of Stage 2, is accomplished through the traversal of the received list and generation therefrom of a hash table of desired connections organized by desired connection nesting depth. The hash table in the present embodiment is extended from the java.util.Hashtable class forming part of the JDK. The key used in the hash table is the nesting depth of the desired connection. As new desired connections are added to the hash table, they are added to a vector of connections associated with the given key. In alternative embodiments, the sorted list may be represented by a data structure other than a hash table, such as a second linked list for example, in which the nodes have been ordered based on desired connection nesting depth.

Figure 6A:
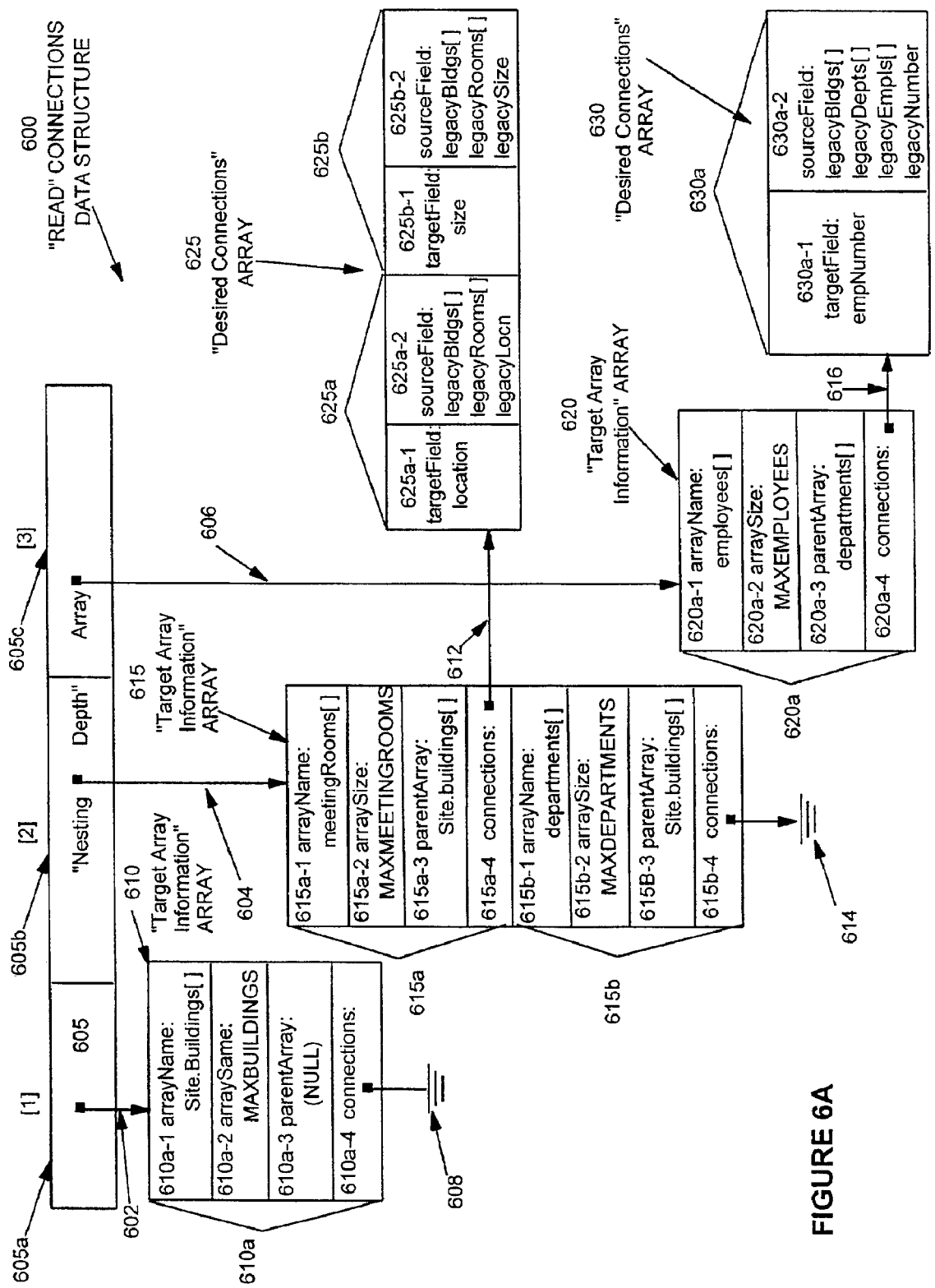
FIGS. 6A and 6B illustrate data structures generated to represent the connections of FIG. 4.
Figure 6B:
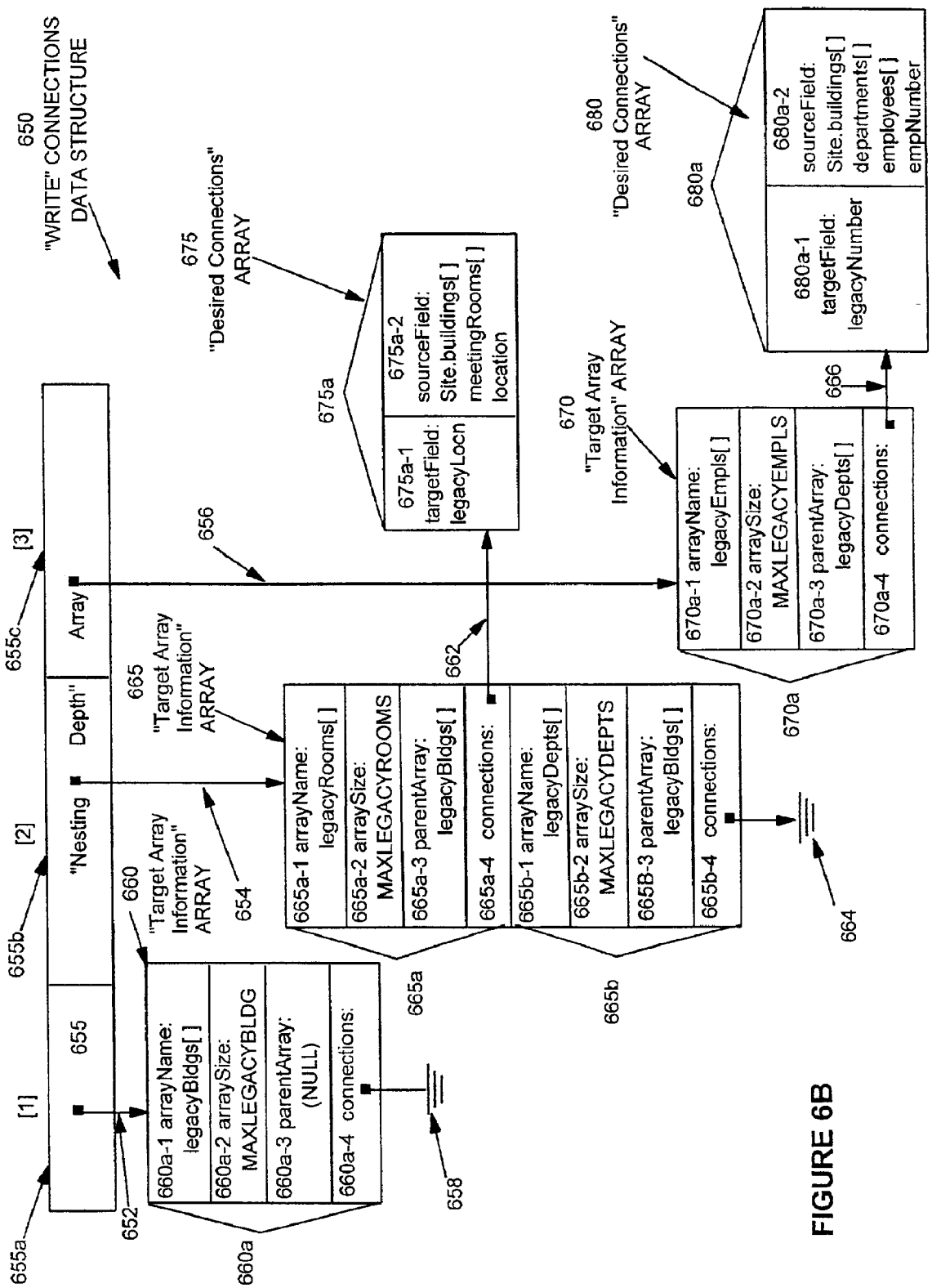
Figure 7:
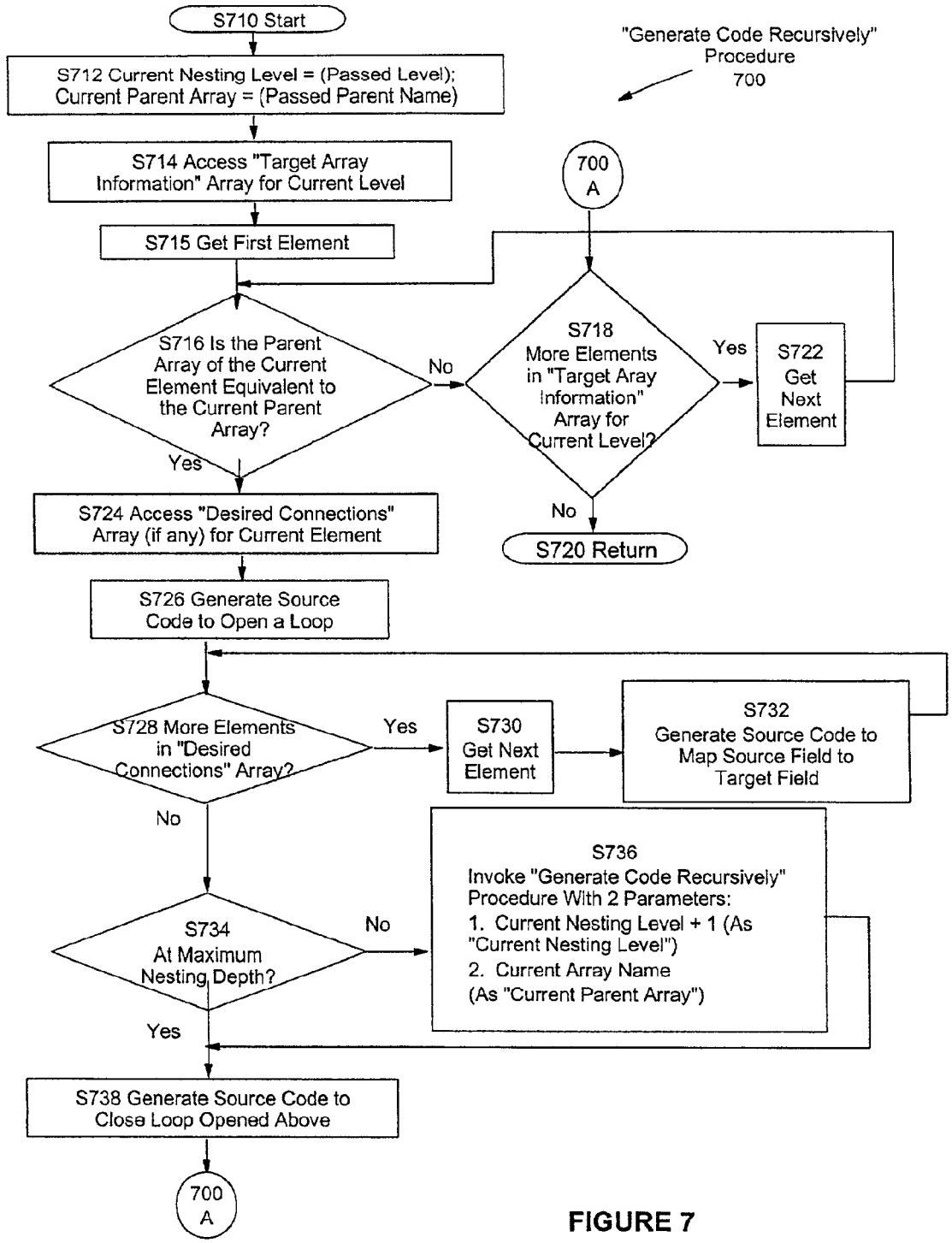
FIG. 7 is a flowchart of steps of a procedure that is executed recursively during code generation by the system of FIG. 1.

In each of the following steps S220 and S222, the sorted hash table of desired connections is traversed to create a "desired connection" data structure. In particular, a "read" connection data structure (RCDS) representing all of the developer's desired "read" connections is generated in step S220, and a "write" connection data structure (WCDS) representing all of the developer's desired "write" connections is generated in step S222. Steps S220 and S222 comprise the second phase of Stage 2. The resulting RCDS and WCDS are illustrated in FIGS. 6A and 6B, respectively.

In order to best understand the structure of the RCDS and WCDS generated during these steps, it is useful to initially visualize the developer's desired connections in the form of a logical tree having a structure based on the level and type of enterprise system array nesting. FIG. 5A illustrates such an exemplary logical tree. Tree 500 represents a developer's "read" mapping connection choices. More specifically, the illustrated tree corresponds to the desired "read" connections of table 400 (FIG. 4). These "read" connections (which are identifiable as such by the presence of a left-pointing or double-headed arrow in column 400b) are the connections indicated by rows 410, 420 and 430. The tree 500 includes a single root node 505, three leaf nodes 520, 525 and 540, and four intermediate nodes 510, 515, 530 and 535. The root node and intermediate nodes are indicated by circles, while the leaf nodes are indicated by squares. The root node 505 is representative of the overall "read" connection mapping task to be performed. The leaf nodes each represent a different desired "read" connection, thus the total number of leaf nodes is equivalent to the total number of desired connections. The intermediate nodes interconnecting the root node and a particular leaf node represent the "target" system arrays that contain the target system field to be mapped, which is associated with that leaf node. Because the desired connections represented in the current logical tree are "read" connections (in which "source" legacy system fields are read into "target" enterprise system fields), the target system in this case is the enterprise system. Each intermediate node that is successively further from the root node is associated with a target (enterprise) system array that is successively more deeply nested. The identity of the target system arrays containing a particular target system field to be mapped is therefore determinable from the intermediate nodes interconnecting the root node and the leaf node corresponding with that field. Since the present embodiment pertains to the mapping of fields that are contained within nested arrays (which by definition comprise at least two arrays in a containment relationship), it follows that the number of intermediate nodes interconnecting the root node 505 and any leaf node in the tree 500 will be at least two.

In the logical tree 500, it may be observed that each of the three desired "read" connections indicated in rows 410, 420 and 430 of the table 400 is represented by a series of interconnected nodes starting with the root node 505 and ending with a different leaf node. In particular, the desired "read" connection indicated in row 410 is represented by interconnected nodes 505, 510, 515 and 520; the desired "read" connection of row 420 is represented by interconnected nodes 505, 510, 515 and 525; and the desired "read" connection of in row 430 is represented by interconnected nodes 505, 510, 530, 535 and 540. Connection-specific information, such as the identity of the corresponding legacy fields with which a connection is desired, may be contained in the leaf nodes 520, 525 and 540.

Figure 5B:
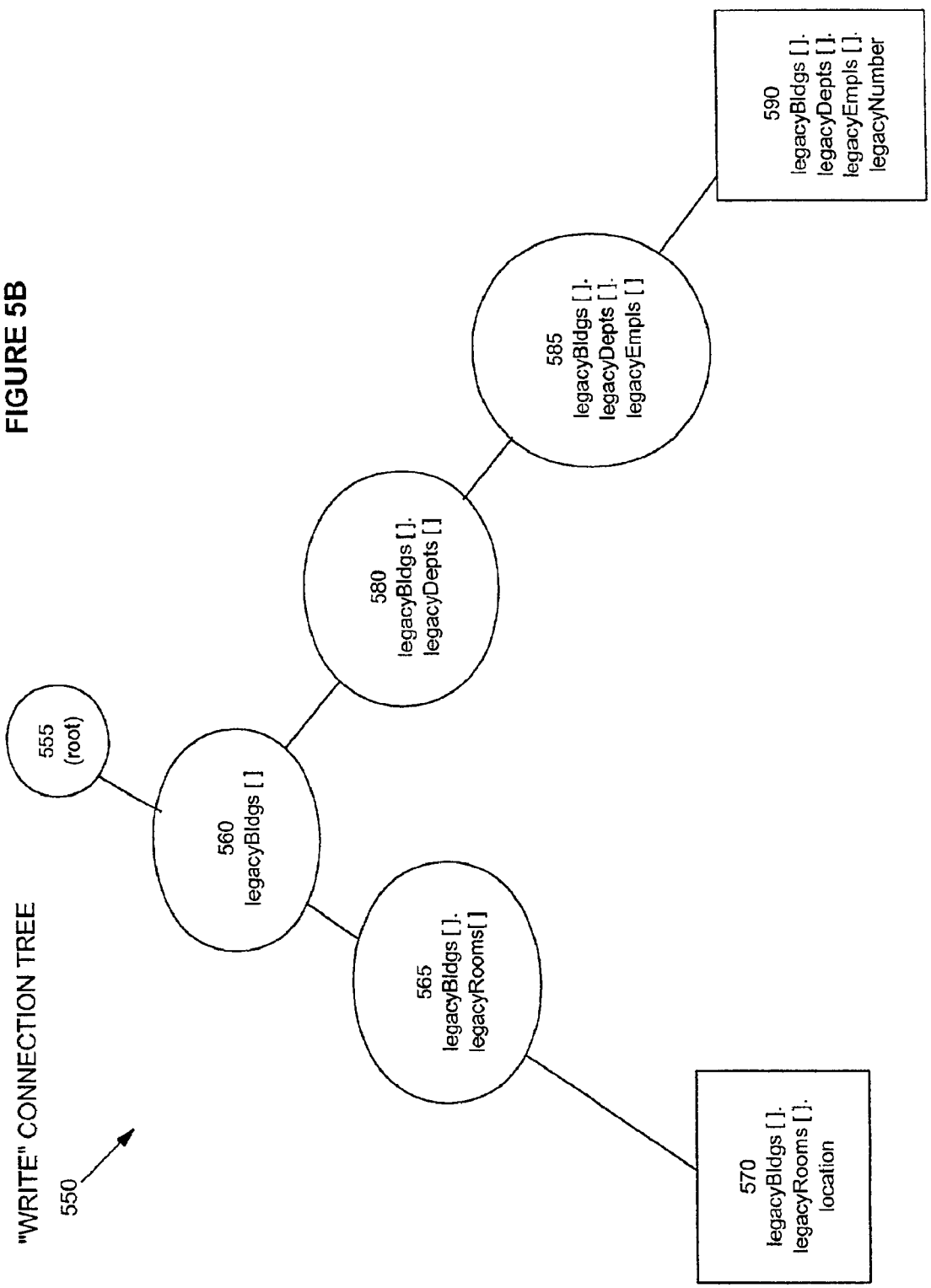

It will be recognized that a developer's desired "write" connections may similarly be visualized in the form of a logical tree analogous to the tree 500. A logical tree corresponding to the desired "write" connections of table 400 (i.e. rows 410 and 430 of FIG. 4, identifiable as desired "write"

connections by the presence of a right-pointing or double-headed arrow in column 400b) is illustrated at 550 in FIG. 5B. It is noted that no node analogous to node 525 exists in tree 550, since no "write" connection is desired for the "legacySize" field. As well, because the "target" system in a "write" connection is the legacy system, each intermediate node in tree 550 is associated with a legacy system array as opposed to an enterprise system array.

Turning to FIG. 6A, it may be observed that the generated RCDS 600 in the present embodiment is essentially a physical implementation of the logical tree 500. The parallels between logical tree 500 and the RCDS 600 will become apparent upon further description of the structure of the RCDS 600. The RCDS 600 is a multi-dimensional ARRAY comprising three types of ARRAYs (in this description, the capitalized term "ARRAY" is used to describe arrays which comprise the RCDS or WCDS, which capitalized term "ARRAY" is to be distinguished from the lowercase term "array" used to describe enterprise or legacy system arrays, or arrays generically).

The first type of ARRAY in the RCDS 600 is the "Nesting Depth" ARRAY (e.g. ARRAY 605). This type of ARRAY represents distinct levels of target system array nesting within the developer's desired "read" connections. Each successive element represents a successively higher nesting level, with the first element corresponding to a nesting level of one. Only one "Nesting Depth" ARRAY 605 is included in the RCDS 600. The number of elements in the "Nesting Depth" ARRAY 605 is equivalent to the maximum nesting level "N" of any "read" connection specified by the developer 26, which in the present example is three.

The second type of ARRAY in the RCDS 600 is the "Target Array Information" ARRAY. This ARRAY is instantiated "N" (i.e. three) times in the RCDS 600, with each instantiation being associated with a different target system array nesting level (again, because the RCDS stores "read" connections, the "target" system in the present case is the enterprise system). The association of each instantiation with its respective target system array nesting level is by way of pointers contained in the elements of the "Nesting Depth" ARRAY 605. Thus in RCDS 600, the first instantiation 610 of the "Target Array Information" ARRAY is associated with nesting level "1" by way of pointer 602 contained in element 605a; the second instantiation 615 is associated with nesting level "2" by way of pointer 604 contained in element 605b; and the third instantiation 620 is associated with nesting level "3" by way of pointer 606 contained in element 605c.

Each element of an "Target Array Information" ARRAY is analogous to an intermediate node in the logical tree 500. As with an intermediate node, there is one "Target Array Information" ARRAY element is associated with each target system array containing (directly or indirectly) a target system field to be mapped. The identity of this associated target system array is discernable from the element's "arrayName" field (described below). As well, by way of its "parentArray" field (also described below), each "Target Array Information" ARRAY element is able to determine the identity of its parent array, if one exists. This is analogous to the interconnection between an intermediate node and its predecessor in the tree 500.

In the present embodiment, an "Target Array Information" ARRAY element (e.g. 610a) includes four fields. The first field "arrayName" (e.g. field 610a-1) is a string indicating the name of the enterprise system array with which the element is associated. The second field "arraySize" (e.g. field 610a-2) is an integer representing the size (i.e. number of elements) of the target system array referenced in the first field. This second field is used to set the proper number of iterations of nested loops during mapping code generation in Stage 3. The third field "parentArray" (e.g. field 610a-3) is a string indicating the identity of the "parent" target system array of the array indicated in the first field "arrayName". A null value in the field "parentArray" indicates that no parent system array exists (i.e. the array indicated by the first field "arrayName" is not contained by any other target system array). Finally, the fourth field "connections" (e.g. field 610a-4) is a pointer which may point to a "Desired Connections" ARRAY (described below), if a field to be mapped exists at the current nesting level and is contained by the target system array identified in the second field.

The third and final type of ARRAY in the RCDS 600 is the "Desired Connections" ARRAY. The total number of instantiations of the "Desired Connections" ARRAY in the RCDS 600 is variable, but will be at least one (provided that at least one "read" connection is desired). In the present example, two "Desired Connections" ARRAYs are present. Each element in a "Desired Connections" ARRAY represents a desired "read" connection and therefore uniquely corresponds to a leaf node in a corresponding logical tree representation. For example, in the RCDS 600 of FIG. 6A, the three elements 625a, 625b and 625c correspond to the three leaf nodes 520, 525, and 540 (respectively) of FIG. 5A.

In the present embodiment, a "Desired Connections" ARRAY element (e.g. 625a) includes two fields. The first field "targetField" (e.g. 625a-1) is a string identifying the target system field to be mapped. The second field "sourceField" (e.g. 625a-2) is a string identifying the source (legacy) system field being mapped to the target (enterprise) system field. In the present embodiment, the latter field includes the identity of the nested system arrays containing the source field to be mapped.

To further assist with the comprehension of the RCDS structure, and in particular to promote a better understanding of the correspondence between the logical tree 500 and the RCDS 600, the representation of a particular desired "read" mapping connection in each of these structures will be described. Specifically, the desired connection between the enterprise system field "Site.buildings[ ].meetingRooms[ ].size" and legacy system field "legacyBldgs[ ]. legacyRooms[ ].legacySize" (indicated in row 420 of the table 400) will be referenced for this purpose.

As captured in the logical tree 500, the desired "read" connection of row 420 is represented by interconnected nodes 505,510,515 and 525. Root node 505 is common to all "read" connections represented in the tree and identifies the "read" connection as comprising part of the overall mapping task to be performed. The first intermediate node 510 represents the outermost target (enterprise) system array "Site.buildings[ ]". The second intermediate node 515 represents the next level of enterprise system array nesting, i.e. the "meetingRooms[ ]" array that is contained within the outermost "Site.buildings[ ]" array. Finally, the leaf node 525 represents the enterprise system field "size" to be mapped, which is contained within the nested arrays "Site.buildings[ ]. meetingRooms[ ]". The node 525 may contain additional information necessary to facilitate a mapping connection, such as the identity of the corresponding legacy field with which a connection is desired, for example.

In comparison, as captured in the RCDS 600, the desired "read" connection of row 420 is represented by the elements 605a and 605b of the "Nesting Depth" ARRAY 605, element 610a of "Target Array Information" ARRAY 610, element 615a of "Target Array Information" ARRAY 615, and element 625a of "Desired Connections" ARRAY 625, as well as pointers 602, 604, and 612. The first element 605a of the "Nesting Depth" ARRAY 605 provides access to the first level of target (enterprise) system array nesting, and thus may be likened to the root node 505 of tree 500. The element 610a of "Target Array Information" ARRAY 610 represents the outermost target enterprise system array "Site.buildings[ ]", and is analogous to intermediate tree node 510. The element 615a of "Target Array Information" ARRAY 615 represents the next level of enterprise system array nesting, i.e. the "meetingRooms[ ]" array that is contained within the outermost "Site.buildings[ ]" array. Element 615a is thus analogous to intermediate tree node 515. It will be noted that element 615a's "child" relationship with the previous element 610a is reflected in the value "Site.buildings[ ]" of its "parentArray" field 615a-3, which indicates that the enterprise system array "Site.buildings[ ]" is the parent of the "current" enterprise system array "meetingRooms[ ]". Finally, element 625b of "Desired Connections" ARRAY 625 represents the desired connection with the target enterprise system field "size", which is contained within the nested arrays "Site.buildings[ ].meetingRooms[ ]". Element 625b is therefore analogous to leaf node 525. The pointers 602, 604, and 612, in conjunction with the "Nesting Depth" ARRAY element 605b, provide an alternative method of "interconnecting" the above-noted elements as compared with the interconnections between the nodes 505, 510, 515 and 525 in the logical tree 500.

In view of this structure of the RCDS 600, it will be apparent that several steps are involved in creating an RCDS from the sorted hash table of "read" connections in step S220. Initially, the "Nesting Depth" ARRAY 605 is allocated with N elements (where N is again the maximum nesting level of any desired "read" connection in the sorted table). Then, for every desired connection in the hash table having a nesting level K, an appropriate element is created in each of the K "Target Array Information" ARRAYs that are associated with nesting levels 1 to K. If any of the requisite K elements is already in existence from a previously processed connection choice sharing a common target system array with the current connection, creation of a new element will be unnecessary. As well, a new element corresponding to the desired connection is created in the appropriate "Desired Connections" ARRAY that is associated with the proper "Target Array Information" ARRAY element of level K. During the course of the creation of these elements, information from the hash table is used to fill in the various "Target Array Information" ARRAY and "Desired Connections" ARRAY element fields as appropriate.

The generation of a WCDS in step S222 is accomplished in an analogous manner to the generation of the RCDS 600 in step S220. The resultant WCDS 650 is illustrated in FIG. 6B. As may be observed, the WCDS 650 is similar to the RCDS 600, with the exception that the "target" system arrays represented by the intermediate nodes are legacy system arrays and not enterprise system arrays. As well, WCDS 650 lacks a "Desired Connections" ARRAY element which corresponds to element 625b of RCDS 600 (because the developer 26 has not chosen to establish a "write" connection with the legacy system field "legacyBldgs[ ].legacyRooms[ ].legacySize").

Thus, at the completion of step S220 and S222 (which may be executed in reverse order in alternative embodiments), the RCDS 600 and WCDS 650 will have been created. Stage 2 concludes with the data structure generator 30 outputting the generated data structures to the source code generator 40 over link 32.

In the third and final stage of operation, the received RCDS and WCDS are processed to generate mapping software source code to implement the desired mapping connections. More specifically, in step S224 "read" mapping source code is generated from the RCDS 600, and in step S226 "write" mapping source code is generated from the WCDS 650. The steps S224 and S226 may be executed in reverse order.

The processing of the RCDS or WCDS in steps S224 and S226 to generate source code may best be understood by way of analogy with the logical tree described previously. Using the generation of "read" connection source code in step S224 as an example, the processing of the RCDS 600 is analogous to a depth-first traversal of the logical tree 500. This depth-first traversal approach is adopted to address a primary difficulty in the generation of nested array mapping source code, namely the creation of nested loops around mapping assignment statements in a manner which avoids redundant outer loops. Such traversal is implemented by way of the following recursive procedure:

1. For each visited ("current") node starting with the root node:
 (a) If the current node is the root node:
  (i) for each child of the current node, repeat step 1 using that child as the "current" node.
 (b) If the current node is an intermediate node:
  (i) emit source code to open a loop having a number of iterations equivalent to the number of elements of the associated target system array;
  (ii) for each child of the current node, repeat step 1 using that child as the "current" node; and
  (iii) when no unvisited children are left, emit source code to close the loop.
 (c) If the current node is a leaf node:
  (i) emit source code to establish a mapping connection.

Invocation of the above procedure results in a depth-first tree traversal having both pre-order and post-order characteristics. In particular, the opening of a loop in step 1(b)(i) corresponds with a pre-order traversal, in that the loop is first opened upon initially visiting an intermediate node before any of its children are visited. On the other hand, the closing of the loop in step 1(b)(iii) corresponds with a post-order traversal, in that the loop is only closed when no unvisited children remain. When adopted in conjunction with a depth first traversal, this pre-order opening of a loop and post-order closing of the loop results in the desired nested loop hierarchy in the generated source code in which redundant outer loops are avoided.

In order to implement the described tree traversal for a logical tree that is implemented in the form of an RCDS, a recursive procedure that follows the same general approach indicated in step 1 above, but is adapted to the RCDS's unique structure, is utilized. Such a recursive procedure "GenerateCodeRecursively" is illustrated in the form of a flowchart of steps 700 in FIG. 7. It will be appreciated that, in the context of a depth-first traversal the RCDS 600 by way of the instant procedure, it is possible for an "intermediate tree node" or "leaf node" (i.e. an ARRAY element) to be examined before it is "visited". Examination is for the purpose of determining whether or not a "node" is a child of a current parent "node". That is, the term "visit" is understood to mean "visit a node that is known to be a child" and not "visit for the purpose of ascertaining whether the node is in fact a child". The distinction will become apparent upon further description of the steps 700 of the "GenerateCodeRecursively" procedure.

The "GenerateCodeRecursively" procedure takes two "in" parameters (i.e. two parameters which are read but not modified by the execution of the procedure). The first parameter, "current_nesting_level", is an integer representing the target system array nesting level to be processed by the execution of the "GenerateCodeRecursively" procedure. The second parameter, "current_parent_array", is an identifier of the parent target system array within which the "GenerateCodeRecursively" procedure is to search, either for object fields to map or for one or more deeply nested arrays which themselves contain (either directly or indirectly) nested array object fields to be mapped.

In a first step S710 of the traversal of RCDS 600, the procedure "GenerateCodeRecursively" is initially invoked with parameter values of "1" for "current_nesting_level" and "null" for "current_parent_array". The initial "current_nesting_level" value of "1" indicates that, during the current invocation of the "GenerateCodeRecursively" procedure, only objects or system arrays having a single level of target system array nesting (i.e. fields/system arrays that are contained within only one other target system array) will be examined. The "current_parent_array" value of "null" indicates that, for the purposes of the present iteration, there is no restriction (in terms of a particular parent target system array) as to which fields/system arrays at the "current_nesting_level" will be processed. In step S712, the passed parameter values of "1" and "null" are assigned to the local parameters "current_nesting_level" and "current_parent_array", respectively.

In step S714, the "Target Array Information" ARRAY 610 associated with the "current_nesting_level" (namely "1") is accessed. In the present embodiment, access to ARRAY 610 is achieved by way of a pointer that is retrieved from the element of the "Nesting Depth" ARRAY 605 that is in the ordinal position corresponding to the "current_nesting_level" parameter value (i.e. ordinal position "1"). More specifically, access to ARRAY 610 is through the pointer 602 retrieved from element 605a. In step S715, the first (and only) element 610a of the "Target Array Information" ARRAY 610 is accessed in a conventional manner. It will be appreciated that at least one element will exist in the ARRAY 610 in the present embodiment, provided that the developer 26 has specified at least one desired "read" connection. As will be clear from the value "Site.buildings[ ]" of the "arrayName" field 610a-1, the accessed element 610a corresponds with the enterprise system array "Site.buildings[ ]". Referencing an analogous traversal of the logical tree 500, the present accessing of element 610a is equivalent to the accessing of the intermediate node 510. For convenience, the most recently accessed element 610a will be referred to as the "current element" until a subsequent element is accessed.

In subsequent step S716, the "parentArray" field 610a-3 of the current element (element 610a) is examined to determine whether the parent system array of the current system array "Site.buildings[ ]" is equivalent to the passed parameter "current_parent_array". In the present case, the parent array of the current system array "Site.buildings[ ]" and the parameter "current_parent_array" both have a value of "null" and are thus found to be equivalent. Thus, drawing upon the logical tree analogy, the "current node" 510 (element 610a) has been examined and found to be a "child" of the "root node", thus the element 610a is now said to be "visited".

Next, step S724 is executed to access the "Desired Connections" ARRAY associated with the current element (element 610a), if one exists. In particular, the value contained within "connections" pointer field 610a-4 of the current element is examined to ascertain whether it is null (indicating that no "Desired Connections" ARRAY exists for this element) or non-null (indicating that a "Desired Connections" ARRAY does in fact exist). In the present case, the "connections" pointer field 610a-4 is found to contain a value of null (represented by the "ground" symbol 608 of FIG. 6A), indicating that an associated "Desired Connections" ARRAY does not exist for element 610a. This absence of an associated "Desired Connections" ARRAY indicates that in the present example, the developer 26 does not desire any "read" connections for enterprise system fields that are directly contained by the "Site.buildings[ ]" system array. In other words, and drawing again upon the logical tree analogy, it has been determined that the current intermediate node 510 has no "leaf" children. As a result, no "Desired Connections" ARRAY is accessed in step S724.

In step S726, source code is generated to open a loop that will allow mapping connections to enterprise system fields that are more deeply nested under the "Site.buildings[ ]" system array (if any such connections are found to exist) to be established. In the present embodiment, the resultant generated source code is illustrated at lines 1 and 2 of FIG. 8A. The generated code comprises an opened "for" loop having a number of iterations "MaxBldgs" (an integer variable). It will be understood that the variable "MaxBldgs", which is initially set to the value stored in the "arraySize" field 610a-2 of the current element (element 610a), is adjustable at run time to handle variations in enterprise and legacy system array sizes at run time, as will be described below with respect to the "MaxRooms" variable.

In step S728, it is determined that no unprocessed elements exist within a "Desired Connections" ARRAY associated with current element 610a (since no "Desired Connections" ARRAY is in fact associated with current element 610a). Accordingly, instep S734, the value of the "current_nesting_level" parameter is compared with a global "maximum nesting depth" variable (which was initially set based on a determined number of elements of the "Nesting Depth" ARRAY 605) to determine whether the maximum nesting level has been reached. In the present case, the "current_nesting_level" value of "1" is found to be less than the "maximum nesting depth" value of "3", thus it is determined that the maximum nesting level has not yet been reached. As a result, the "GenerateCodeRecursively" procedure illustrated in FIG. 8 is invoked recursively in step S736 with a first parameter value of "current_nesting_level"+1 (i.e. "2") and a second parameter value comprising the "arrayName" field of the current element (i.e. the value "Site.buildings[ ]" of the "arrayName" field 610a-1 of element 610a).

With reference to the analogous logical tree traversal once again, at this stage it is desired to search for any children of node 510 that may exist. Because of the recursive invocation of the "GenerateCodeRecursively" procedure which occurs in step S736, step S710 is executed next. In step S712, the passed parameter values of "2" and "Site.buildings[ ]" are assigned to the local parameters "current_nesting_level" and "current_parent_array", respectively.

In step S714, the "Target Array Information" ARRAY 615 associated with the current_nesting_level" value of "2" is accessed. Access to ARRAY 615 is achieved by way of a pointer that is retrieved from the element of the "Nesting Depth" ARRAY 605 that is in the ordinal position corresponding to the "current_nesting_level" (i.e. ordinal position "2"). More specifically, access to ARRAY 615 is through the pointer 604 retrieved from element 605b. In step S715, the first element 615a of the "Target Array Information" ARRAY 615 is accessed in a conventional manner. As will be clear from the value "meetingRooms[ ]" of the "arrayName" field 615a-1, the accessed element 615a corresponds with the enterprise system array "meetingRooms[ ]" (and is analogous to logical tree node 515). For convenience, this most recently accessed element 615a will be referred to as the "current element" until a subsequent element is accessed.

In step S716, the "parentArray" field 615a-3 of the current element (element 615a) is examined to determine whether the parent array of the current enterprise system array "meetingRooms[ ]" is equivalent to the passed parameter "current_parent_array" (analogously, to determine whether the current tree node 515 is in fact a "child" of node 510). This examination reveals that the value "Site.buildings[ ]" contained in the "parentArray" field 615a-3 is equivalent to the value "Site.buildings[ ]" of the "current_parent_array" parameter. As a result, step S724 is executed to access the "Desired Connections" ARRAY associated with the current element (element 615a), if one exists. More specifically, the value contained within "connections" pointer field 615a-4 of the current element is examined to ascertain whether it is null (indicating that no "Desired Connections" ARRAY exists for this element) or non-null (indicating that a "Desired Connections" ARRAY does in fact exist). In the present case, the "connections" pointer field 615a-4 is found to contain a non-null value (represented by the pointer 612 of FIG. 6A), indicating that a "Desired Connections" ARRAY does in fact exist (and, according to the logical tree analogy, that current tree node 515 does in fact have "leaf node" children). Thus, the "Desired Connections" ARRAY 625 is accessed by way of the pointer 612 in a conventional manner.

In step S726, source code is generated to open a loop that will allow the mapping connections represented in the "Desired Connections" ARRAY 625 (as well as any "read" connections to enterprise system fields that are more deeply nested under the "meetingRooms[ ]" system array, if any exist) to be established. The resultant generated source code is illustrated at lines 3 and 4 of FIG. 8A. The generated code comprises an opened "for" loop having a number of iterations equivalent to the value of an integer variable "MaxRooms". It will be understood that the variable "MaxRooms", which is initially set to the value stored in the "arraySize" field 615a-2 of the current element (element 615a), is adjustable at run time to handle variations in enterprise and legacy system array sizes at run time. More specifically, if the enterprise system array "meetingRooms[ ]" is found to be equal in size to the legacy system array "legacyRooms[ ]" at run time, the size of the variable "MaxRooms" is not changed and mapping is straightforward. If the enterprise system array is determined to be larger than the legacy system array at run time, the number of iterations "MaxRooms" will be set to match the size of the smaller (legacy) array. Consequently, all instances of the legacy system field will be mapped to corresponding instances of the enterprise system field, with one or more instances of the enterprise system field being left unmapped. If on the other hand the enterprise system array is found to be smaller than the legacy system array, the value of the variable "MaxRooms" will be set to match the size of the larger (legacy) array. In this case, an alternative path in the code (which was generated during code generation but is not illustrated) is executed in which additional space is allocated the enterprise system to cause the enterprise system array "meetingRooms[ ]" to effectively be at least as large as the legacy system array "legacyRooms[ ]". Mapping may thereafter proceed in the usual manner.

In step S728, the accessed "Desired Connections" ARRAY 625 is examined to determine whether any unprocessed elements exist therein. This examination reveals that the first element 625a of ARRAY 625 has not yet been processed. Therefore, in step S730, the element 625a is accessed in a conventional manner. The fields 625a-1 ("targetField") and 625a-2 ("sourceField") of the accessed connection element 625a indicate that a mapping connection is desired between the new object field "Site.buildings[ ].meetingRooms[ ].location" (as indicated by the combination of the values in fields 610a-1, 615a-1 and 625a-1) and the legacy field "legacyBldgs[ ].legacyRooms[ ].legacyLocn" (as indicated in field 625a-2). Accordingly, in step S732 the source code illustrated at lines 5 and 6 of FIG. 8A is generated to create the desired mapping connection. At run time, the method "APIgetLegacyData" will be invoked for each iteration of the containing "for" loops and will return a legacy data value from legacy field "legacyBldgs[i].legacyRooms[j].legacyLocn", which will be assigned to the new object field "Site.buildings[i].meetingRooms[j].location" to effect the desired "read" connection.

In a second execution of step S728, the accessed "Desired Connections" ARRAY 625 is examined to determine whether any unprocessed elements exist therein. This examination reveals that the second element 625b of ARRAY 625 has not yet been processed. Therefore, in step S730, the next connection element 625b is accessed in a conventional manner. The fields 625b-1 and 625b-2 of the accessed element 625b indicate that a mapping connection is desired between the new object field "Site.buildings[ ].meetingRooms [ ].size" (as indicated by the combination of the values in fields 610a-1, 615a-1 and 625b-1) and the legacy field "legacyBuildings [ ].legacyRooms[ ].legacySize" (as indicated in field 625b-2). Accordingly, in step S732 the source code illustrated at lines 8 and 9 of FIG. 8A is generated to create the desired mapping connection.

In a third execution of step S728, the accessed "Desired Connections" ARRAY 625 is examined to determine whether any unprocessed elements exist therein. This examination reveals that no unprocessed elements remain in the ARRAY 625. Referencing the logical tree traversal analogy once again, at this stage the leaf nodes 520 and 525 (analogous to elements 625a and 625b) have been processed (i.e. corresponding connection code has been generated), and it is now desired to check for non-leaf children of current node 515. Accordingly, in step S734, the value of the "current_nesting_level" parameter is compared with a global "maximum nesting depth" variable to determine whether the maximum nesting level has been reached. In the present case, the "current_nesting_level" parameter value of "2" is found to be less than the "maximum nesting depth" value of "3", thus it is determined that the maximum nesting level has not yet been reached. As a result, the "GenerateCodeRecursively" procedure is invoked recursively in step S736 with a first parameter value of "current_nesting_level"+1 (i.e. "3") and a second parameter value comprising the "arrayName" field of the current element (i.e. the value "meetingRooms[ ]" of the "arrayName" field 615a-1 of element 615a).

As a result of the recursive invocation of the "GenerateCodeRecursively" procedure which occurs in step S736, step S710 is executed next. In step S712, the passed parameter values of "3" and "meetingRooms[ ]" are assigned to the local parameters "current_nesting_level" and "current_parent_array", respectively.

In step S714, the "Target Array Information" ARRAY 620 associated with the "current_nesting_level" value of "3" is accessed. Access to ARRAY 620 is achieved by way of a pointer that is retrieved from the element of the "Nesting Depth" ARRAY 605 that is in the ordinal position corresponding to the "current_nesting_level" parameter value (i.e. ordinal position "3"). More specifically, access to ARRAY 620 is through the pointer 606 retrieved from element 605c. Thereafter, the first element 620a of the accessed "Target Array Information" ARRAY 620 is accessed in step S715 in a conventional manner. As will be clear from the value "employees[ ]" of the "arrayName" field 620a-1, the accessed element 620a corresponds with the system array "employees[ ]" (and is analogous to logical tree node 535). For convenience, this most recently accessed element 620a will be referred to as the "current element" until a subsequent element is accessed.

In step S716, the "parentArray" field 620a-3 of the current element (element 620a) is examined to determine whether the parent system array of the current system array "employees[ ]" is equivalent to the passed parameter "current_parent_array". This examination reveals that the value "departments[ ]" contained in the "parentArray" field 620a-3 is in fact different from the value "meetingRooms[ ]" of the "current_parent_array" parameter (i.e. that analogous logical tree node 535 is not in fact a child of node 515). Drawing once again upon the logical tree analogy, the "current node" 535 (element 620a) has now been examined and found not to be a "child" of node 515 (element 615a), thus the element 620a is not "visited" at this time. As a result, step S718 is executed to determine whether more unprocessed elements exist within the "Target Array Information" ARRAY 620 for the current level. In the present instance, it is determined that no unprocessed elements exist within the ARRAY 620, and therefore step S720 is executed to return control to the calling procedure. Thus at this stage, it has been determined that element 615a (which corresponds to tree node 515) has no "non-leaf children".

Upon the execution of the return statement in step S720 above, the system is restored to its previous state (i.e. the state prior to the recursive invocation of the "GenerateCodeRecursively" procedure in step S736 above). Accordingly, the value of the "current_nesting_level" parameter is restored to "2" and the value of the "current_parent_array" parameter is restored to "Site.buildings[ ]".

In step S738, source code illustrated at line 10 of FIG. 8A is generated to close the for-loop previously opened in step S726. The closure of this loop signifies that there are no further enterprise system fields to be mapped nested in system arrays below the most recently examined system array "Site.buildings[ ].meetingRooms[ ]". In the subsequent step S718, the "Target Array Information" ARRAY 615 for the current level ("2") is examined to determine whether more unprocessed elements exist therein. This examination reveals the presence of an ARRAY element 615b that has not yet been processed. As a result, this element 615b is accessed in step S722 in a conventional manner. As will be clear from the value "departments[ ]" of the "arrayName" field 615b-1, the accessed element 615b corresponds with the system array "departments[ ]" (i.e. the array declared at line 7 of FIG. 3A) as well as logical tree node 530. For convenience, this most recently accessed element 615b will be referred to as the "current element" until a subsequent element is accessed.

In subsequent step S716, the "parentArray" field 615b-3 of the current element (element 615b) is examined to determine whether the parent system array of the current system array "departments[ ]" is equivalent to the passed parameter "current_parent_array". This examination reveals that the value "Site.buildings[ ]" contained in the "parentArray" field 615b-3 is equivalent to the value "Site.buildings[ ]" of the "current_parent_array" parameter (thus confirming that the element 615b is a "child" of element 610a). As a result, step S724 is executed to access the "Desired Connections" ARRAY associated with the current element (element 615b), if one exists. More specifically, the value contained within "connections" pointer field 615b-4 of the current element is examined to ascertain whether it is null or non-null. In the present case, the "connections" pointer field 615b-4 is found to contain a value of null (represented by the "ground" symbol 614 of FIG. 6A), indicating that an associated "Desired Connections" ARRAY does not exist in the present instance (i.e. that analogous logical tree node 530 has no "leaf node" children). Thus, no "Desired Connections" ARRAY is accessed in step S724.

In step S726, source code is generated to open a loop that will allow mapping connections to enterprise system fields that are more deeply nested under the "departments[ ]" system array (if any such connections exist) to be established. In the present embodiment, the resultant generated source code is illustrated at lines 11 and 12 of FIG. 8A. The generated code comprises an opened "for" loop having a number of iterations equivalent to the value of a variable "MaxDepts". It will be understood that, like the variable "MaxRooms" described above, the variable "MaxDepts", which is initially set to the value stored in the "arraySize" field 615b-2 of the current element (element 615b), is adjustable at run time to handle variations in enterprise and legacy system array sizes at run time, as described previously.

In step S728, it is determined that no unprocessed elements exist within a "Desired Connections" ARRAY associated with current element 615b (since no "Desired Connections" ARRAY is in fact associated with current element 615b). Accordingly, in step S734, the value of the "current_nesting_level" parameter is compared with a global "maximum nesting depth" variable to determine whether the maximum nesting level has been reached. In the present case, the "current_nesting_level" value of "2" is found to be less than the "maximum nesting depth" value of "3", thus it is determined that the maximum nesting level has not yet been reached. As a result, the "GenerateCodeRecursively" procedure is invoked recursively in step S736 with a first parameter value of "current_nesting_level"+1 (i.e. "3") and a second parameter value comprising the "arrayName" field of the current element (i.e. the value "departments[ ]" of the "arrayName" field 615b-1 of element 615b). The purpose of this recursive invocation is to check for "non-leaf" children of element 615b (corresponding to tree node 530).

As a result of the recursive invocation of the "GenerateCodeRecursively" procedure which occurs in step S836, step S710 is executed next. In step S712, the passed parameter values of "3" and "departments[ ]" are assigned to the local parameters "current_nesting_level" and "current_parent_array", respectively.

In step S714, the "Target Array Information" ARRAY 620 associated with the "current_nesting_level" value of "3" is accessed. Access to ARRAY 620 is achieved by way of a pointer that is retrieved from the element of the "Nesting Depth" ARRAY 605 that is in the ordinal position corresponding to the "current_nesting_level" parameter value (i.e. ordinal position "3"). More specifically, access to ARRAY 620 is through the pointer 606 retrieved from element 605c. Thereafter, the first element 620a of the accessed "Target Array Information" ARRAY 620 is accessed in step S715 in a conventional manner. For convenience, this most recently accessed element 620a will be referred to as the "current element" until a subsequent element is accessed.

In subsequent step S716, the "parentArray" field 620a-3 of the current element (element 620a) is examined to determine whether the parent system array of the current system array "departments[ ]" is equivalent to the passed parameter "current_parent_array". This examination reveals that the value ".departments" contained in the "parentArray" field 620a-3 is equivalent to the value "departments[ ]" of the "current_parent_array" parameter (thus confirming that element 620a (analogous to tree node 535) is a "child" of element 615b (tree node 650)). As a result, step S724 is executed to access the "Desired Connections" ARRAY associated with the current element (element 620a), if one exists. More specifically, the value contained within "connections" pointer field 620a-4 of the current element is examined to ascertain whether it is null or non-null. In the present case, the "connections" pointer field 620a-4 is found to contain a non-null value (represented by the pointer 616 of FIG. 6A), indicating that a "Desired Connections" ARRAY does in fact exist (and that "leaf node" children exist). Thus, the "Desired Connections" ARRAY 630 is accessed by way of the pointer 616 in a conventional manner.

In step S726, source code is generated to open a loop that will allow the mapping connections represented in the "Desired Connections" ARRAY 630 to be established. The resultant generated source code is illustrated at lines 13 and 14 of FIG. 8A. The generated code comprises an opened "for" loop having a number of iterations equivalent to the value of a variable "MaxEmpls". It will be understood that, like the variable "MaxRooms" described above, the variable "MaxEmpls", which is initially set to the value stored in the "arraySize" field 620a-2 of the current element (element 620a), is adjustable at run time to handle variations in enterprise and legacy system array sizes at run time, as described previously.

In step S728, the accessed "Desired Connections" ARRAY 630 is examined to determine whether any unprocessed elements exist therein. This examination reveals that the first element 630a of ARRAY 630 has not yet been processed. Therefore, in step S730, the element 630a (analogous to logical tree leaf node 540) is accessed in a conventional manner. The fields 630a-1 ("targetField") and 630a-2 ("sourceField") of the accessed connection element 630a indicate that a "read" mapping connection is desired between the new object field "Site.buildings[ ].departments[ ].employees[ ].empNumber" (as indicated by the combination of the values in fields 610a-1, 615b-1, 620a-1 and 630a-1) and the legacy field "legacyBldgs[ ].legacyDepts[ ]. legacyEmpls[ ].legacyNumber" (as indicated in field 630a-2). Accordingly, in step S732 the source code illustrated at lines 15 to 17 of FIG. 8A is generated to create the desired mapping connection.

In a second execution of step S728, the accessed "Desired Connections" ARRAY 630 is examined to determine whether any unprocessed elements exist therein. This examination reveals that no unprocessed elements remain in the ARRAY 630 (i.e. that all of the "leaf nodes" under current analogous tree node 535 have been processed).

Accordingly, in step S734, the "current_nesting_level" is compared with a global "maximum nesting depth" variable to determine whether the maximum nesting level has been reached. In the present case, the "current_nesting_level" value of 3 is found to be equivalent to the "maximum nesting depth" value of 3, thus it is determined that the maximum nesting level has in fact been reached (and that no "children" of the current element can therefore exist). As a result, in step S738 source code illustrated at line 18 of FIG. 8A is generated to close the for-loop previously opened in step S726. The closure of this loop signifies that there are no further enterprise system fields to be mapped that are nested in system arrays below the most recently examined system array "Site.buildings[ ].departments[ ].employees[ ]". In the subsequent step S718, the "Target Array Information" ARRAY 620 for the current level ("3") is examined to determine whether more unprocessed elements exist therein. In the present instance, it is determined that no unprocessed elements exist within the ARRAY 620, and therefore step S720 is executed to return control to the calling procedure.

Upon the execution of the return statement in step S720 above, the system is restored to its previous state (i.e. the state prior to the recursive invocation of the "GenerateCodeRecursively" procedure in step S736 above). Accordingly, the value of the "current nesting level" parameter is restored to "2" and the value of the "current_parent_array" parameter is restored to "Site.buildings[ ]".

In step S738, source code illustrated at line 19 of FIG. 8A is generated to close the for-loop previously opened in step S726. The closure of this loop signifies that there are no further enterprise system fields to be mapped nested in system arrays below the most recently examined system array "Site.buildings[ ].departments[ ]". In the subsequent step S718, the "Target Array Information" ARRAY 615 for the current level ("2") is examined to determine whether more unprocessed elements exist therein. In the present instance, it is determined that no unprocessed elements exist within the ARRAY 615, and therefore step S720 is executed to return control to the calling procedure.

Upon the execution of the return statement in step S720 above, the system is restored to its previous state. Accordingly, the value of the "current_nesting_level" parameter is restored to "1" and the value of the "current_parent_array" parameter is restored to "null".

In step S738, source code illustrated at line 20 of FIG. 8A is generated to close the for-loop previously opened in step S726. The closure of this loop signifies that there are no further enterprise system fields to be mapped nested in system arrays below the most recently examined system array "Site.buildings[ ]". In the subsequent step S718, the "TargetArray Information" ARRAY 610 for the current level ("1") is examined to determine whether more unprocessed elements exist therein. In the present instance, it is determined that no unprocessed elements exist within the ARRAY 610, and therefore step S720 is executed to return control to the calling procedure. The execution of this final return statement concludes the last remaining iteration of the recursive procedure.

At this stage, the RCDS 600 has been fully traversed and the "read" mapping code illustrated in FIG. 8A has been generated. It will be understood that the source code illustrated in FIG. 8A represents the core functionality necessary to implement the developer's desired "read" connections at run time. In practice, the generation of further source code together with the aforedescribed "core" code may be necessary. Typically, further source code will comprise a containing module "around" the core code. For example, the fully generated code may comprise a procedure or function that may be invoked at run time as necessary. Alternatively, in an object-oriented environment, the generated code may comprise part of method within a class definition for example. As well, the generated source code may be physically stored in a variety of ways, such as one or more electronic files. At the conclusion of step S224, the generated source code is written to an electronic file and output from the source code generator 40 over link 42.

In step S226, "write" mapping source code is generated by way of a traversal of the WCDS 650 in a manner analogous to the above-described traversal of the RCDS 600. It will be appreciated that, like the variables "MaxBldgs", "MaxRooms", "MaxDepts" and "MaxEmpls" described above in the context of generated "read" mapping code, the looping iteration variables "MaxLegacyBldgss", "MaxLegacyRooms", "MaxLegacyDepts" and "MaxLegacyEmpls" in the "write" mapping code are adjustable at run time to handle variations in enterprise and legacy system array sizes at run time. Unlike the "read" mapping code, however, it may not be possible to establish mapping connections in certain situations. As an example, if the enterprise system array "meetingRooms[ ]" is found to be equal in size to the legacy system array "legacyRooms[ ]" at run time, the size of the variable "MaxLegacyRooms" is not changed and mapping is straightforward. If the enterprise system array is determined to be smaller than the legacy system array at run time, the number of iterations "MaxLegacyRooms" will be set to match the size of the smaller (enterprise) array. Consequently, all instances of the enterprise system field will be mapped to corresponding instances of the legacy system field, with one or more instances of the legacy system field being left unmapped. If however the enterprise system array is found to be larger than the legacy system array, mapping cannot proceed, because additional space may not be allocated on the legacy system. In this case, an alternative path in the code (which was generated during code generation but is not illustrated) is executed to throw an exception indicative of the problem.

The resulting "write" connection source code, which is illustrated in FIG. 8B, is similarly written to an electronic file (which, in the present embodiment, is the same file as the one to which the "read" connection mapping code was written) and output over link 42 to conclude the step S226. This output of the "write" connection source code brings to an end the third and final stage of operation.

As will be appreciated by those skilled in the art, modifications to the above-described embodiment can be made without departing from the essence of the invention. For example, rather than employing an RCDS 600 and a WCDS 650, a single data structure having the same basic structure could be employed. In that event, a directionality indicator could be stored within each element of the "Desired Connections" ARRAY (as an additional field for example). The single data structure may then be traversed once when "read" mapping source code is being generated and once when "write" mapping is being generated. During each traversal, connection code will only be generated when the directionality indicator of the processed "Desired Connection" ARRAY elements corresponds with the operative directionality.

In addition, although the nodes/elements of the logical tree(s) and RCDS/WCDS are associated with arrays of the target system in the present embodiment contain, in an alternative embodiment these nodes/elements could be associated with arrays of the source system.

Also, although the present embodiment is described to establish mapping connections between enterprise system fields and legacy system fields, the same approach may be adopted to establish mapping connections between nested array object fields of any two systems, regardless of whether they are classifiable as an "enterprise" system and a "legacy" system.

Fundamentally, a physical tree data structure may be utilized in place of the described RCDS or WCDS structures to implement the logical tree. The structure of an implemented physical tree would essentially duplicate the structure of the logical tree. Also, as with the RCDS and WCDS, a physical tree representation may comprise two physical trees (a "read" connection tree and a "write" connection tree) or a single physical tree with included connection directionality indicators. Traversal of the physical tree(s) during source code generation could be by way of a recursive procedure which follows the steps 1(a)–(c) described above.

Regardless of the nature of the data structure implemented to represent the logical tree, in the case where a single structure is utilized, the desired connections may be assumed to have a particular directionality. In this case, no directionality information would need to be represented in the desired connection list generated by the connection list generator 20 or in the data structure generated by the data structure generator 30. Instead, the assumed directionality may simply be implemented within the generated source code as a matter of course.

With regard to system input, the received enterprise and legacy system nested array object field information may not comprise source code. Instead, this information may be expressed in an alternative format, such as a proprietary format having a particular lexicon for example.

As well, the procedure utilized to traverse the logical tree need not be recursive. Alternative embodiments may employ alternative algorithms which achieve the same result of mapping source code generation without recursion.

Other modifications will be apparent to those skilled in the art and, therefore, the invention is defined in the claims.

What is claimed is:

1. A computer-implemented method of generating program source code in a computing environment to perform a mapping task in which enterprise system nested array object fields and legacy system nested array object fields are mapped to one another, said method comprising:

performing a depth-first traversal of a logical tree having a root node, a leaf mode for each desired mapping connection, and intermediate nodes between said root node and said leaf nodes, each intermediate node being associated with an array, the depth-first traversal comprising:

(i) for each intermediate node visited when traversing away from said root node, generating program source code to open a loop;

(ii) for each visited leaf node, generating program source code to create the mapping connection represented by said visited leaf node; and (iii) for each intermediate node having no unvisited children that is visited when traversing towards said root node, generating program source code to close said loop.

2. The method of claim 1, wherein said array with which each intermediate node is associated is an enterprise system array.

3. The method of claim 1, wherein said array with which each intermediate node is associated is a legacy system array.

4. The method of claim 1, wherein said loop opened in step said (i) has a number iterations corresponding to a size of the array associated with said visited intermediate node.

5. The method of claim 1, wherein said logical tree is represented by a tree data structure.

6. A computer-implemented method of generating program source code to perform a mapping task in which enterprise system nested array object fields and legacy system nested array object fields are mapped to one another, said method comprising:
   (a) receiving a list of desired mapping connections between enterprise system fields and legacy system fields;
   (b) for each desired connection between an enterprise system field and a legacy system field, determining connection information comprising:
      (i) she identity of the nested enterprise arrays containing said enterprise system field;
      (ii) the identity of the nested legacy arrays containing said legacy system field; and
      (iii) a nesting level of said connection;
   (c) creating a logical tree representative of said mapping task comprising:
      (i) a root node;
      (ii) one leaf node for each said desired mapping connection; and
      (iii) for each leaf node, N intermediate nodes interconnecting said leaf node and said root node, where N is equivalent to the determined nesting level of the connection associated with said leaf node, and where each of the N intermediate nodes that is successively further from the root node is associated with an array that is successively more deeply nested; and
   (d) performing a depth-first traversal of said logical tree to generate mapping source code, said traversal comprising:
      (i) for each intermediate node visited when traversing away from said root node, generating program source code to open a loop;
      (ii) for each visited leaf node, generating program source code to create the mapping connection represented by said visited leaf node; and
      (iii) for each intermediate node having no unvisited children that is visited when traversing towards said root node, generating program source code to close said loop.

7. The method of claim 6, wherein said array with which said each of the N intermediate nodes is associated is an enterprise system array containing an enterprise system field to be mapped.

8. The method of claim 6, wherein said array with which said each of the N intermediate nodes is associated is a legacy system array containing a legacy system field to be mapped.

9. The method of claim 6, wherein said loop opened in said step (d) substep (i) has a number of iterations corresponding to a size of the array associated with said visited intermediate node.

10. The method of any of claim 6, wherein said step (c) further comprises, for each said leaf node corresponding to a desired connection, associating with said leaf node at least some of the connection information determined in said step (b).

11. The method of any of claim 6, wherein said connection information determined in step (b) for each desired mapping connection further comprises a mapping directionality indicator to indicate whether said connection permits a reading of said legacy system field into said enterprise system field; a writing of said enterprise system field into said legacy system field, or both.

12. The method of claim 11, wherein said step (c) further comprises, for each said leaf node corresponding to a desired connection, associating with said leaf node a determined mapping directionality indicator.

13. A computer readable medium storing computer software that, when loaded into a computing device, adapts said device to:
   perform a depth-first traversal of a logical tree having a root node, a leaf node for each desired mapping connection, and intermediate nodes between said root node and said leaf nodes, each intermediate node being associated with an array, the depth-first traversal comprising:
      (i) for each intermediate node visited when traversing away from said root node, generating program source code to open a loop;
      (ii) for each visited leaf node, generating program source code to create the mapping connection represented by said visited leaf node; and
      (iii) for each intermediate node having no unvisited children that is visited when traversing towards said root node, generating program source code to close said loop.

14. The medium of claim 13, wherein said array with which each intermediate node is associated is an enterprise system array.

15. The medium of claim 13, wherein said array with which each intermediate node is associated is a legacy system array.

16. The medium of claim 13, wherein said loop opened has a number of iterations corresponding to a size of the array associated with said visited intermediate node.

17. A computer readable medium storing computer software that, when loaded into a computing device, adapts said device to:
   (a) receive a list of desired mapping connections between enterprise system fields and legacy system fields;
   (b) determine, for each desired connection between an enterprise system field and a legacy system field, connection information comprising:
      (i) the identity of the nested enterprise arrays containing said enterprise system field;
      (ii) the identity of the nested legacy arrays containing said legacy system field; and
      (iii) a nesting level of said connection;
   (c) create a logical tree representative of said mapping task comprising:
      (i) a root node;
      (ii) one leaf node for each said desired mapping connection; and
      (iii) for each leaf node, N intermediate nodes interconnecting said leaf node and said root node, where N is equivalent to the determined nesting level of the connection associated with said leaf node, and where each of the N intermediate nodes that is successively further from the root node is associated with an array that is successively more deeply nested; and
   (d) perform a depth-first traversal of said logical tree to generate mapping source code, said traversal comprising:
      (i) for each intermediate node visited when traversing away from said root node, generating program source code to open a loop;

(ii) for each visited leaf node, generating program source code to create the mapping connection represented by said visited leaf node; and (iii) for each intermediate node having no unvisited children that is visited when traversing towards said root node, generating program source code to close said loop.

18. The medium of claim 17, wherein said array with which said each of the N intermediate nodes is associated is an enterprise system array containing an enterprise system field to be mapped.

19. The medium of claim 17, wherein said array with which said each of the N intermediate nodes is associated is a legacy system array containing a legacy system field to be mapped.

20. The medium of claim 17, wherein said loop opened in step (d)(i) has a number of iterations corresponding to a size of the array associated with said visited intermediate node.

21. The medium of claim 17, wherein said element (c) to create a logical tree further comprises, for each said leaf node corresponding to a desired connection, associating with said leaf node at least some of the connection information determined in said element (b).

22. The medium of claim 17, wherein said connection information determined in said element (b) for each desired mapping connection further comprises a mapping directionality indicator to indicate whether said connection permits a reading of said legacy system field into said enterprise system field, a writing of said enterprise system field into said legacy system field, or both.

23. The medium of claim 22, wherein said clement (c) further comprises, for each said leaf node corresponding to a desired connection, associating with said leaf node a determined mapping directionality indicator.

24. In a computing environment including a processor and persistent storage memory in communication with said processor, a system for performing a depth-first traversal of a logical tree having a root node, a leaf node for each desired mapping connection, and intermediate nodes between said root node and said leaf nodes, each intermediate node being associated with an array, said system comprising:

means, for each intermediate node visited when traversing away from said root node, for generating program source code to open a loop;

means, for each visited leaf node, fit generating program source code to create the mapping connection represented by said visited leaf node; and means, for each intermediate node having no unvisited children that is visited when traversing towards said root node, fit generating program source code to close said loop.

25. In a computing environment including a processor and persistent storage memory in communication with said processor, a system comprising:

(a) means for receiving a list of desired mapping connections between enterprise system fields and legacy system fields;

(b) means for determining, for each desired connection between an enterprise system field and a legacy system field, connection information comprising:
  (i) the identity of the nested enterprise arrays containing said enterprise system field;
  (ii) the identity of the nested legacy arrays containing said legacy system field; and
  (iii) a nesting level of said connection;

(c) means for creating a logical tree representative of said mapping task comprising:
  (i) a root node;
  (ii) one leaf node for each said desired mapping connection; and
  (iii) for each leaf node, N intermediate nodes interconnecting maid leaf node and said root node, where N is equivalent to the determined nesting level of the connection associated with said leaf node, and where each of the N intermediate nodes that is successively further from the root node is associated with an army that is successively more deeply nested; and (d) means for performing a depth-first traversal of said logical tree to generate mapping source code, said traversal comprising:
  (i) for each intermediate node visited when traversing away from said root node, moans for generating program source code to open a loop;
  (ii) for each visited leaf node, means for generating program source code to create the mapping connection represented by said visited leaf node; and
  (iii) for each intermediate node having no unvisited children that is visited when traversing towards said root node, means for generating program source code to close said loop.

26. A computer-implemented method of generating program source code to perform a mapping task in which nested array object fields of a first system and nested array object fields of a second system are mapped to one another, said method comprising:

(a) receiving a list of desired mapping connections between nested array object fields of a first system and nested array object fields of a second system;

(b) determining, for each desired connection between a field of the first system and a field of the second system, connection information comprising:
  (i) the identity of the nested arrays containing said first system field;
  (ii) the identity of the nested arrays containing said second system field; and
  (iii) a nesting level of said connection;

(c) creating a logical tree representative of said mapping task comprising:
  (i) a root node;
  (ii) one leaf node for each said desired mapping connection; and
  (iii) for each leaf node, N intermediate nodes interconnecting said leaf node and said root node, where N is equivalent to the determined nesting level of the connection associated with said leaf node, and where each of the N intermediate nodes that is successively further from the root node is associated with an array that is successively more deeply nested; and (d) performing a depth-first traversal of said logical tree to generate mapping source code, said traversal comprising:
  (i) for each intermediate node visited when traversing away from said root node, generating program source code to open a loop;
  (ii) for each visited leaf node, generating program source code to create the mapping connection represented by said visited leaf node; and
  (iii) for each intermediate node having no unvisited children that is visited when traversing towards said root node, generating program source code to close said loop.

* * * * *

UNITED STATES PATENT AND TRADEMARK OFFICE
CERTIFICATE OF CORRECTION

PATENT NO. : 6,928,642 B2
DATED : August 9, 2005
INVENTOR(S) : Ilene Ruth Seelemann It is certified that error appears in the above-identified patent and that said Letters Patent is hereby corrected as shown below:

Column 29,
Line 14, replace "(i) she" with -- (i) the --.

Column 31,
Line 30, between "said" and "(c)" replace "clement" with -- element --.
Line 44, between "leaf node," and "generating" replace "fit" with -- for --.
Line 49, between "root node," and "generating" replace "fit" with -- for --.

Column 32,
Line 5, replace "maid" with -- said --.
Line 9, replace "army" with -- array --.
Line 15, replace "moans" with -- means --.

Signed and Sealed this

Twenty-first Day of February, 2006

JON W. DUDAS
*Director of the United States Patent and Trademark Office*